(12) United States Patent
Akl et al.

(10) Patent No.: US 12,075,494 B2
(45) Date of Patent: Aug. 27, 2024

(54) WIRELESS NODE INTEGRATION WITH NO DISTRIBUTED UNIT SETUP

(71) Applicant: QUALCOMM Incorporated, San Diego, CA (US)

(72) Inventors: Naeem Akl, Somerville, NJ (US); Karl Georg Hampel, Hoboken, NJ (US); Sony Akkarakaran, Poway, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/452,002

(22) Filed: Oct. 22, 2021

(65) Prior Publication Data

US 2023/0128780 A1 Apr. 27, 2023

(51) Int. Cl.
*H04W 76/10* (2018.01)
*H04W 88/04* (2009.01)
*H04W 88/14* (2009.01)
*H04W 92/24* (2009.01)

(52) U.S. Cl.
CPC ........... *H04W 76/10* (2018.02); *H04W 88/04* (2013.01); *H04W 88/14* (2013.01); *H04W 92/24* (2013.01)

(58) Field of Classification Search
CPC ..... H04W 76/10; H04W 88/04; H04W 88/14; H04W 92/24; H04W 28/0215; H04W 40/22; H04W 92/12
See application file for complete search history.

(56) References Cited

U.S. PATENT DOCUMENTS

| | | | |
|---|---|---|---|
| 2021/0092666 A1 | 3/2021 | Hampel et al. | |
| 2021/0235520 A1* | 7/2021 | Stauffer | H04B 7/15528 |
| 2021/0345225 A1* | 11/2021 | Novlan | H04W 8/24 |
| 2021/0377980 A1* | 12/2021 | Fujishiro | H04W 40/22 |
| 2022/0322225 A1* | 10/2022 | Vangala | H04W 76/10 |
| 2022/0369186 A1* | 11/2022 | Diao | H04W 36/00835 |
| 2023/0403067 A1* | 12/2023 | Visa | H04L 47/34 |

OTHER PUBLICATIONS

"3rd Generation Partnership Project, Technical Specification Group Radio Access Network, NG-RAN, Architecture description (Release 16)", 3GPP TS 38.401, 3rd Generation Partnership Project (3GPP), Mobile Competence Centre, 650, Route Des Lucioles, F-06921 Sophia-Antipolis Cedex, France, vol. Ran WG3, No. V16.7.0, Oct. 1, 2021, 79 Pages, XP052057083, p. 65-p. 67, figures 8.12.1-1, 8.12.2-1.

(Continued)

*Primary Examiner* — Kibrom T Hailu
(74) *Attorney, Agent, or Firm* — Harrity & Harrity, LLP

(57) ABSTRACT

Various aspects of the present disclosure generally relate to wireless communication. In some aspects, a wireless node may establish a connection with a base station. The wireless node may provide, to the base station, an indication that the wireless node has backhauling capability. The wireless node may receive a backhauling configuration from the base station over the connection after providing the indication that the wireless node has backhauling capability. Numerous other aspects are described.

30 Claims, 14 Drawing Sheets

(56) References Cited

OTHER PUBLICATIONS

CATT: "On BAP Configuration for IAB", 3GPP TSG-RAN WG2 Meeting #107, R2-1908839, 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019, 4 Pages, XP051766660, p. 3.

Intel Corporation (Rapporteur): "Report for [106#48] [IAB] BAP Modelling (Intel)", 3GPP TSG RAN WG2 Meeting #107, R2-1910445 Email Discussion 106_48 Bap_Modeling_Summary, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019, 47 Pages, XP051768223, p. 12.

International Search Report and Written Opinion—PCT/US2022/076485—ISA/EPO—Dec. 13, 2022.

\* cited by examiner

WIRELESS NODE INTEGRATION WITH NO DISTRIBUTED UNIT SETUP

FIELD OF THE DISCLOSURE

Aspects of the present disclosure generally relate to wireless communication and to techniques and apparatuses for wireless node integration with no distributed unit (DU) setup.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless node. The method may include establishing a connection with a base station. The method may include providing, to the base station, an indication that the wireless node has backhauling capability. The method may include receiving a backhauling configuration from the base station over the connection after providing the indication that the wireless node has backhauling capability.

Some aspects described herein relate to a method of wireless communication performed by a base station. The method may include establishing a connection with a wireless node. The method may include receiving, from the wireless node, an indication that the wireless node has backhauling capability. The method may include transmitting a backhauling configuration to the wireless node over the connection based at least in part on receiving the indication that the wireless node has backhauling capability.

Some aspects described herein relate to a wireless node for wireless communication. The wireless node may include a memory and one or more processors coupled to the memory. The one or more processors may be configured to establish a connection with a base station. The one or more processors may be configured to provide, to the base station, an indication that the wireless node has backhauling capability. The one or more processors may be configured to receive a backhauling configuration from the base station over the connection after providing the indication that the wireless node has backhauling capability.

Some aspects described herein relate to a base station for wireless communication. The base station may include a memory and one or more processors coupled to the memory. The one or more processors may be configured to establish a connection with a wireless node. The one or more processors may be configured to receive, from the wireless node, an indication that the wireless node has backhauling capability. The one or more processors may be configured to transmit a backhauling configuration to the wireless node over the connection based at least in part on receiving the indication that the wireless node has backhauling capability.

Some aspects described herein relate to a non-transitory computer-readable medium that stores a set of instructions for wireless communication by a wireless node. The set of instructions, when executed by one or more processors of the wireless node, may cause the wireless node to establish a connection with a base station. The set of instructions, when executed by one or more processors of the wireless node, may cause the wireless node to provide, to the base station, an indication that the wireless node has backhauling capability. The set of instructions, when executed by one or more processors of the wireless node, may cause the wireless node to receive a backhauling configuration from the base station over the connection after providing the indication that the wireless node has backhauling capability.

Some aspects described herein relate to a non-transitory computer-readable medium that stores a set of instructions for wireless communication by a base station. The set of instructions, when executed by one or more processors of the base station, may cause the base station to establish a connection with a wireless node. The set of instructions, when executed by one or more processors of the base station, may cause the base station to receive, from the wireless node, an indication that the wireless node has backhauling capability. The set of instructions, when executed by one or more processors of the base station, may cause the base station to transmit a backhauling configuration to the wireless node over the connection based at least in part on receiving the indication that the wireless node has backhauling capability.

Some aspects described herein relate to an apparatus for wireless communication. The apparatus may include means for establishing a connection with a base station. The apparatus may include means for providing, to the base station, an indication that the apparatus has backhauling capability. The apparatus may include means for receiving a backhauling configuration from the base station over the connection after providing the indication that the apparatus has backhauling capability.

Some aspects described herein relate to an apparatus for wireless communication. The apparatus may include means for establishing a connection with a wireless node. The apparatus may include means for receiving, from the wireless node, an indication that the wireless node has backhauling capability. The apparatus may include means for transmitting a backhauling configuration to the wireless node over the connection based at least in part on receiving the indication that the wireless node has backhauling capability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
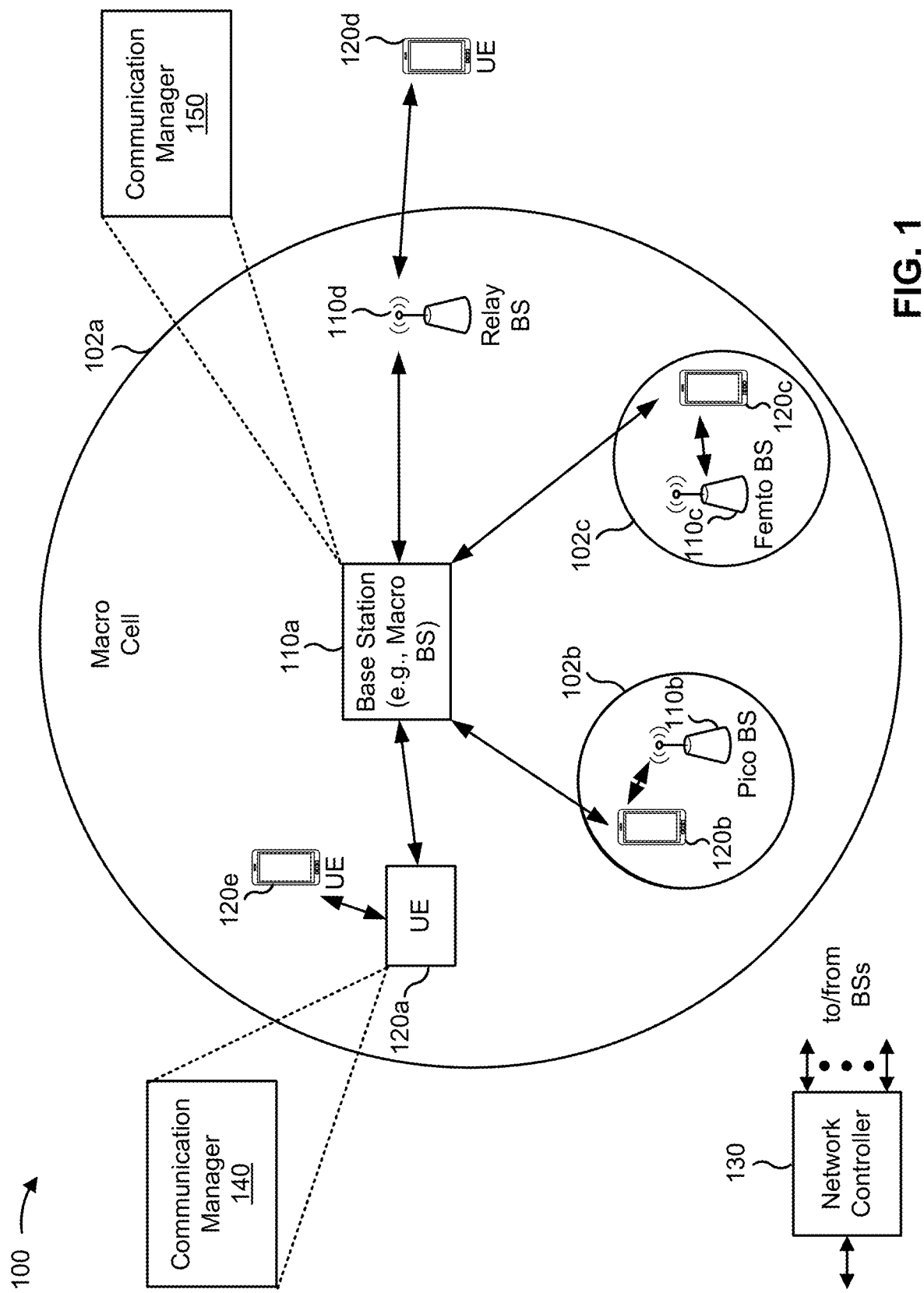
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless node (e.g., a base station 110, a UE 120, or another type of wireless communication device described herein) may include a communication manager 140. As described in more detail elsewhere herein, the communication manager 140 may establish a connection with a base station (e.g., a base station 110); provide, to the base station, an indication that the wireless node has backhauling capability; and receive a backhauling configuration from the base station over the connection after providing the indication that the wireless node has backhauling capability. Additionally, or alternatively, the communication manager 140 may perform one or more other operations described herein.

In some aspects, the base station 110 may include a communication manager 150. As described in more detail elsewhere herein, the communication manager 150 may establish a connection with a wireless node (e.g., a base station 110, a UE 120, or another type of wireless communication device described herein); receive, from the wireless node, an indication that the wireless node has backhauling capability; and transmit a backhauling configuration to the wireless node over the connection based at least in part on receiving the indication that the wireless node has backhauling capability. Additionally, or alternatively, the communication manager 150 may perform one or more other operations described herein.

As indicated above, FIG. 1 is provided as an example. Other examples may differ from what is described with regard to FIG. 1.

Figure 2:
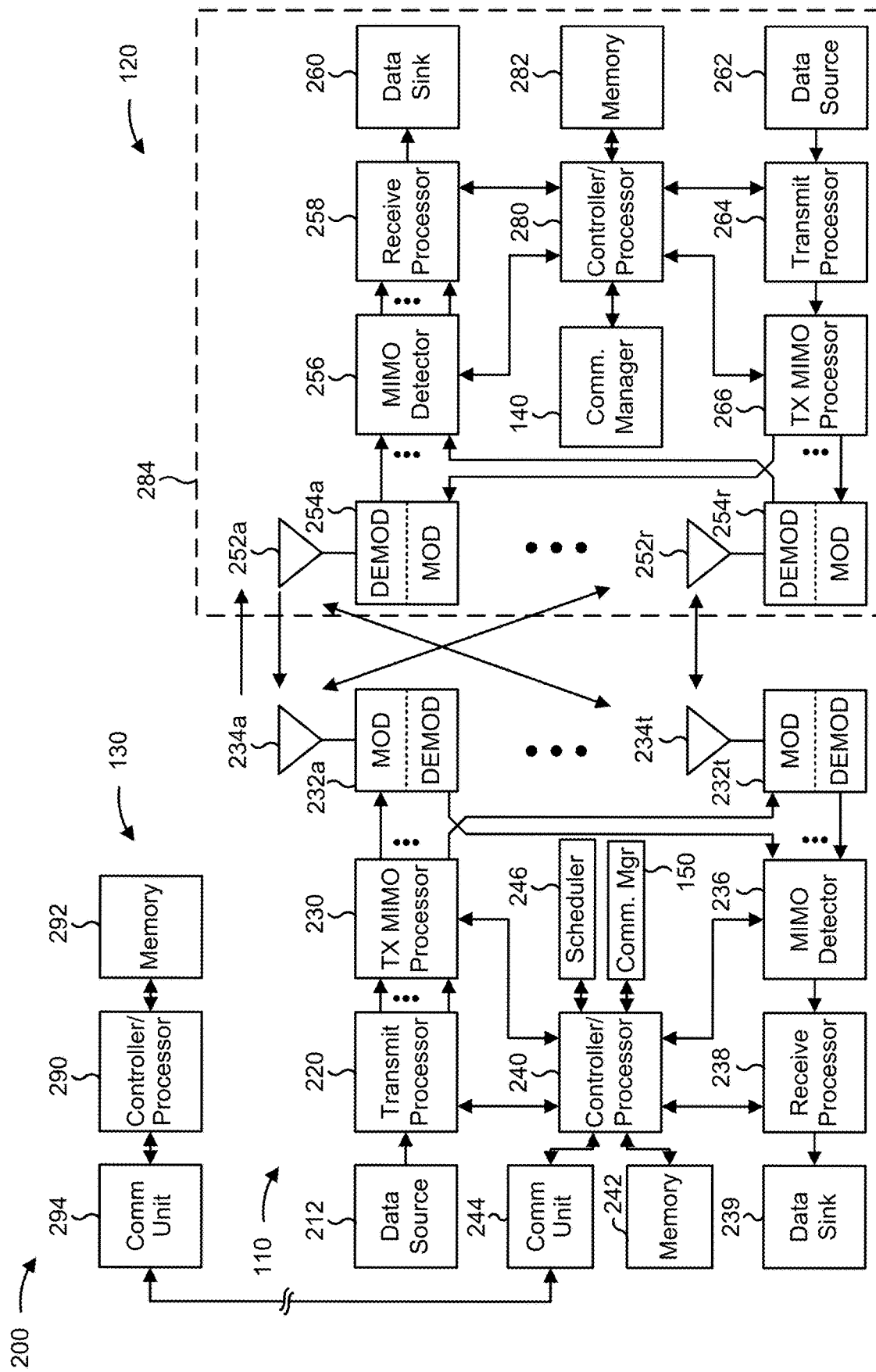
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 10-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 10-14).

The controller/processor 240 of the base station 110, the controller/processor 280 of the UE 120, and/or any other component(s) of FIG. 2 may perform one or more techniques associated with wireless node integration with no distributed unit (DU) setup, as described in more detail elsewhere herein. In some aspects, a wireless node or an IAB donor described herein is the base station 110, is included in the base station 110, or includes one or more components of the base station 110 shown in FIG. 2. In some aspects, a wireless node or an IAB donor described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or Sinterpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a wireless node (e.g., a base station 110, a UE 120, or another type of wireless communication device described herein) includes means for establishing a connection with a base station (e.g., a base station 110); means for providing, to the base station, an indication that the wireless node has backhauling capability; and/or means for receiving a backhauling configuration from the base station over the connection after providing the indication that the wireless node has backhauling capability. In some aspects, the means for the wireless node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246. In some aspects, the means for the wireless node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., a base station 110) includes means for establishing a connection with a wireless node (e.g., a base station 110, a UE 120, or another type of wireless communication device described herein); means for receiving, from the wireless node, an indication that the wireless node has backhauling capability; and/or means for transmitting a backhauling configuration to the wireless node over the connection based at least in part on receiving the indication that the wireless node has backhauling capability. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
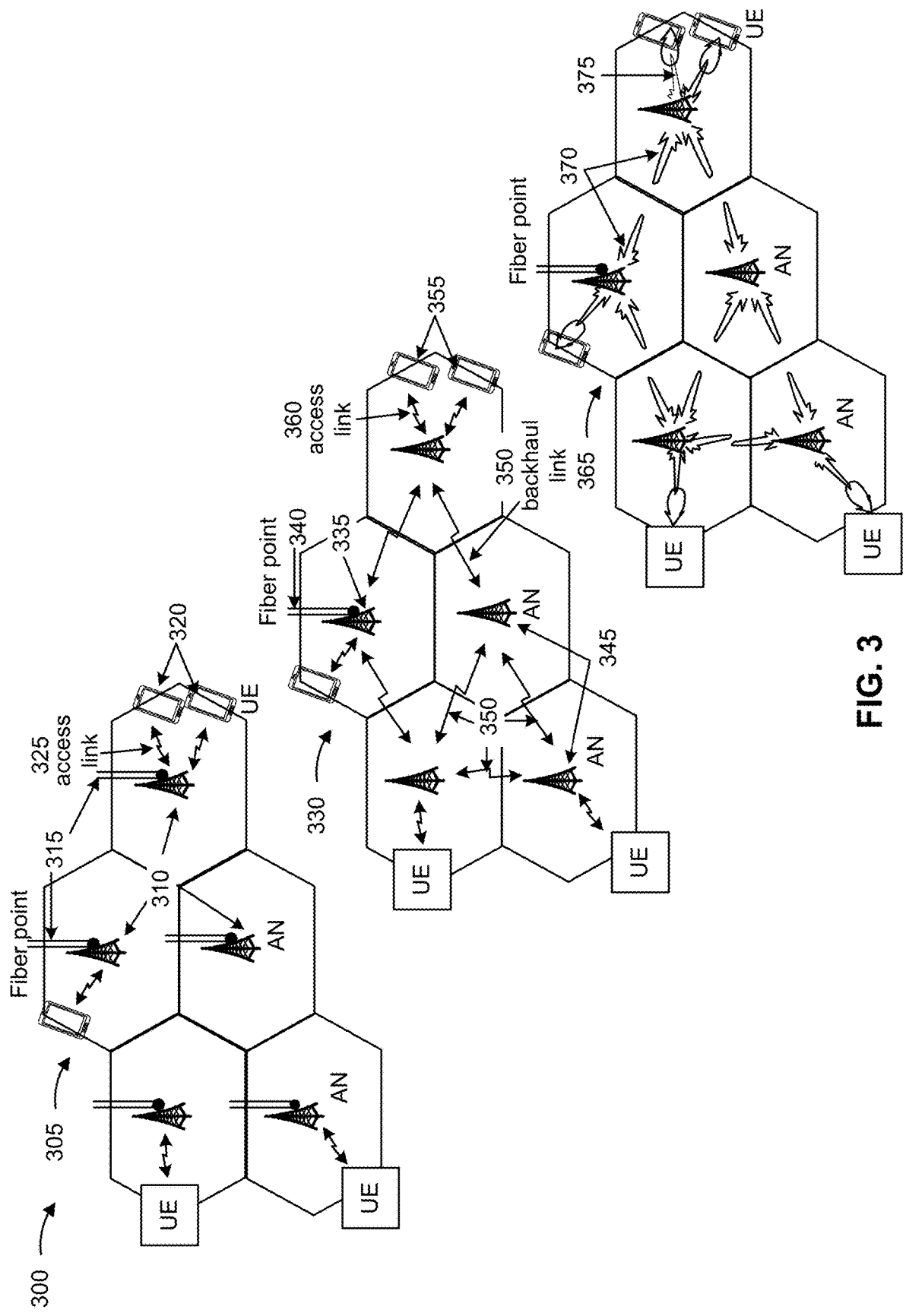
FIG. 3 is a diagram illustrating examples of radio access networks, in accordance with the present disclosure.

FIG. 3 is a diagram illustrating examples 300 of radio access networks, in accordance with the present disclosure.

As shown by reference 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB donor). The IAB network may include one or more non-anchor base stations 345, sometimes referred to as relay base stations or IAB nodes (or IAB nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

In some aspects, wireless node integration with no DU setup, as described herein, may be configured for and performed in an IAB network described in association with FIG. 3.

As indicated above, FIG. 3 is provided as an example. Other examples may differ from what is described with regard to FIG. 3.

Figure 4:
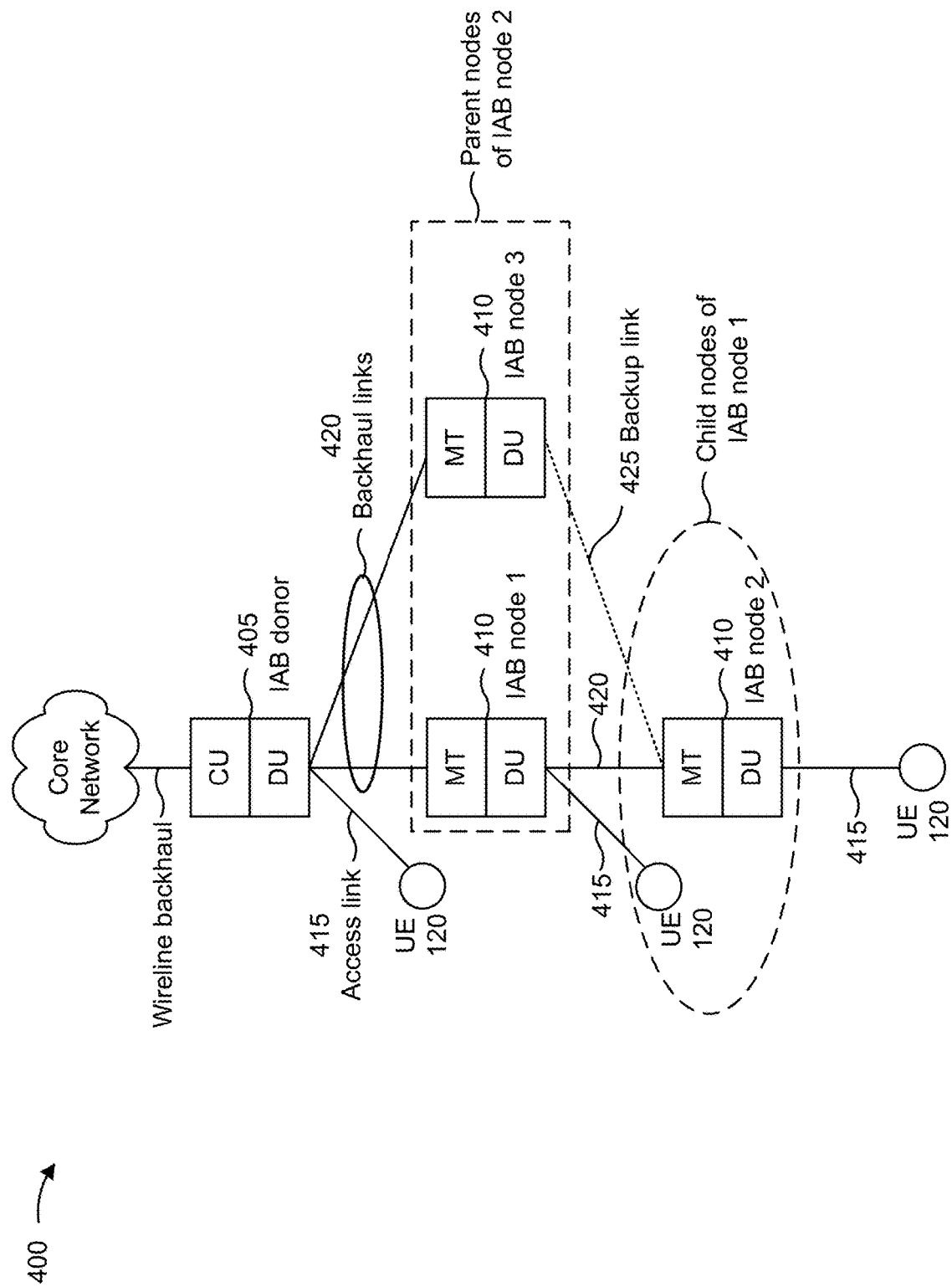
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station 335, as described above in connection with FIG. 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB node 1, IAB node 2, and IAB node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB node 2 and IAB node 3 may be used for backhaul communications if a primary backhaul link between IAB node 2 and IAB node 1 fails. As used herein, "node" or "wireless node" may refer to an IAB donor 405 or an IAB node 410.

In some aspects, wireless node integration with no DU setup, as described herein, may be configured for and performed in an IAB network having the network architecture described in association with FIG. 4.

As indicated above, FIG. 4 is provided as an example. Other examples may differ from what is described with regard to FIG. 4.

Figure 5:
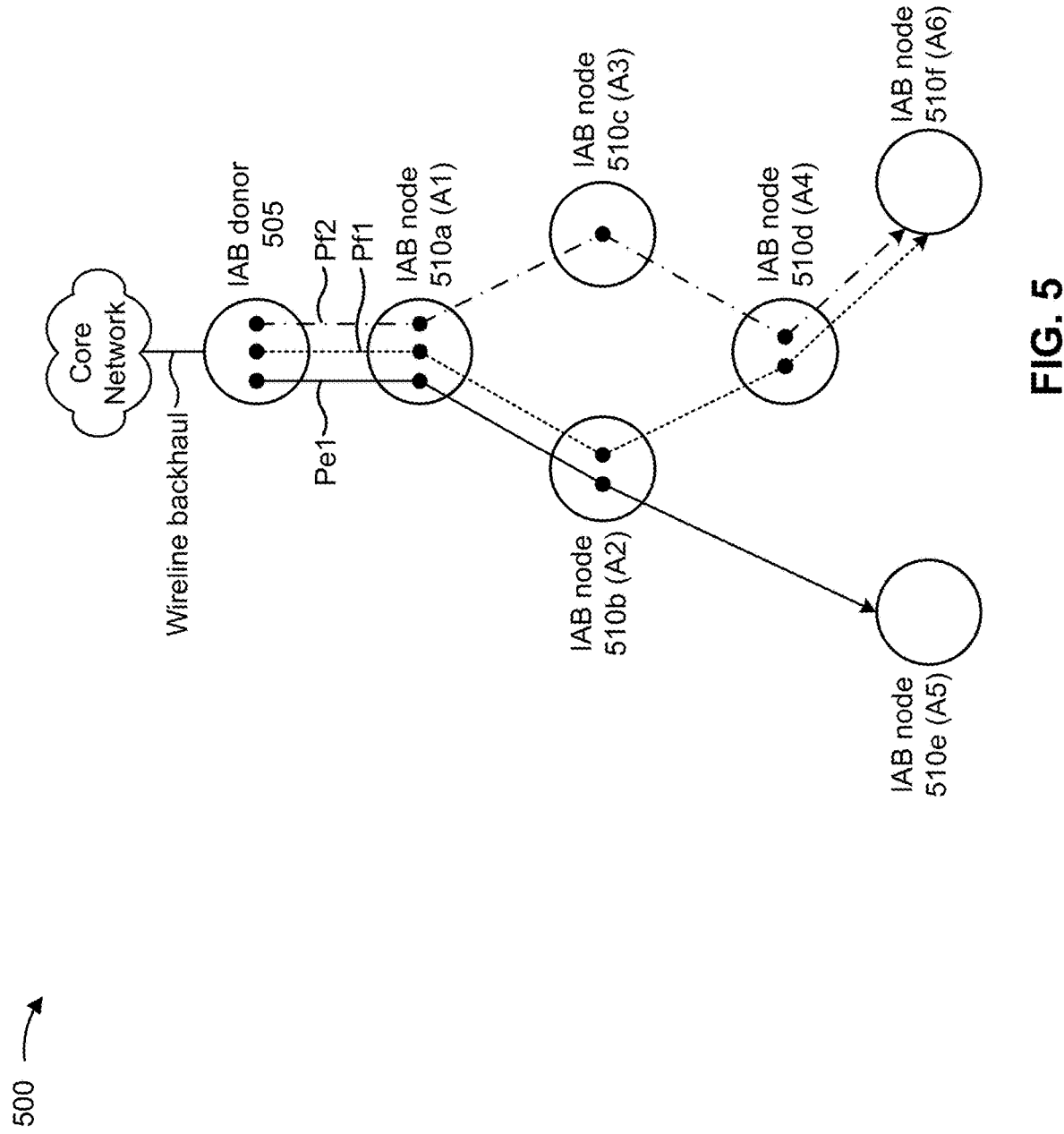
FIG. 5 is a diagram illustrating an example of backhaul adaptation protocol (BAP) routing across a wireless backhaul in accordance with the present disclosure.

FIG. 5 is a diagram illustrating an example 500 of routing across a wireless backhaul such as an IAB network, in accordance with the present disclosure. Example 500 includes an IAB donor 505 (e.g., base station 110, anchor base station 335, a DU of IAB donor 405, or the like), and a set of IAB nodes 510a through 510f (e.g., a set of wireless nodes including one or more base stations 110, UEs 120, anchor base stations 335, non-anchor base stations 345, IAB nodes 410, or the like). Communications may be routed from the IAB donor 505 to an endpoint via one or more of the IAB nodes 510. Backhaul adaptation protocol (BAP) layers of the IAB nodes 510 and the IAB donor 505 may facilitate the routing of such communications, as described below. Each IAB node 510 may be associated with an identifier, herein referred to as a BAP address. For example, IAB node 510a is associated with a BAP address of "A1," IAB node 510b is associated with a BAP address of "A2," and so on. A BAP address may be used to indicate a destination node for a packet. For example, the destination node may an IAB node 510 serving as an access node for a UE 120 (not shown)) in the downstream direction (i.e., from the IAB donor 505 to the UE through one or more IAB nodes 510), or may be the IAB donor 505 in the upstream direction (i.e., from the UE 120 through one or more IAB nodes 510).

A packet may be routed via a path according to the BAP protocol. Three example paths are shown in FIG. 5. The three paths are differentiated from each other by different line patterns. Each path is associated with a path identifier, herein referred to as a BAP path identifier. A given IAB node 510 may be configured with information (referred to herein as a routing configuration) indicating a next hop corresponding to a combination of a given BAP path identifier and a given BAP address. The BAP path identifier can differentiate multiple routes to the same destination node. For example, a first path, shown by a dotted arrow, is associated with a path identifier of Pf1 and a second path, shown by a dotted and dashed arrow, is associated with a BAP path identifier of Pf2. In this case, the first path and the second path both lead to IAB node 510f. By configuring different paths between the same source and destination nodes (e.g., between the IAB donor 505 and the IAB node 510f) using different path identifiers, the IAB donor provides resilience and multiple options for routing to a given destination node (e.g., if a node on the first path fails, the packet can instead be routed via the second path), as well as enabling load balancing across the topology.

A transmitting node (e.g., the IAB donor 505 or an IAB node 510) may generate a packet including a BAP header. For example, the BAP layer of the transmitting node may add the BAP header when the packet enters the BAP layer of the transmitting node from an upper layer. The BAP header may identify a BAP routing identifier. The BAP routing identifier may include a BAP address of a destination node of the packet, as well as a BAP path identifier for a path to the destination node. On intermediate hops, the packet is routed to a next hop based at least in part on the BAP routing identifier and based at least in part on the routing configuration described above. Once the destination node receives the packet, the destination node may identify the packet as destined to the destination node based at least in part on the BAP address identified by the BAP routing identifier.

For example, referring to example 500, a packet generated by the IAB donor 505 may be destined to IAB node 510f. The packet may include a BAP header. The BAP header may identify a BAP routing identifier, which may indicate a BAP address of A6 and a BAP route identifier of Pf1. The IAB donor 505 may transmit the packet to IAB node 510a. IAB node 510a may determine that the packet is not destined to IAB node 510a (since the BAP address of A6 does not match IAB node 510a's BAP address of A1). Furthermore, IAB node 510a may be configured with a routing configuration indicating that a next hop associated with the BAP routing identifier is IAB node 510b. IAB node 510b may perform similar operations as IAB node 510a, and may determine, based at least in part on a routing configuration, that the next hop associated with the BAP routing identifier is IAB node 510d. IAB node 510d may perform similar operations as IAB nodes 510a and 510b, and may determine, based at least in part on a routing configuration, that the next hop associated with the BAP routing identifier is IAB node 510f. IAB node 510f may determine that the packet is destined to IAB node 510f (since the BAP address of A6 matches IAB node 510f's BAP address of A6). IAB node 510f may provide a payload of the packet to a UE 120 associated with IAB node 510f (such as a UE 120 to which the packet is destined as identified by the packet).

In some aspects, wireless node integration with no DU setup, as described herein, may be performed in an IAB network that utilizes the routing concepts described in association with FIG. 5.

As indicated above, FIG. 5 is provided as an example. Other examples may differ from what is described with regard to FIG. 5.

Figure 6:
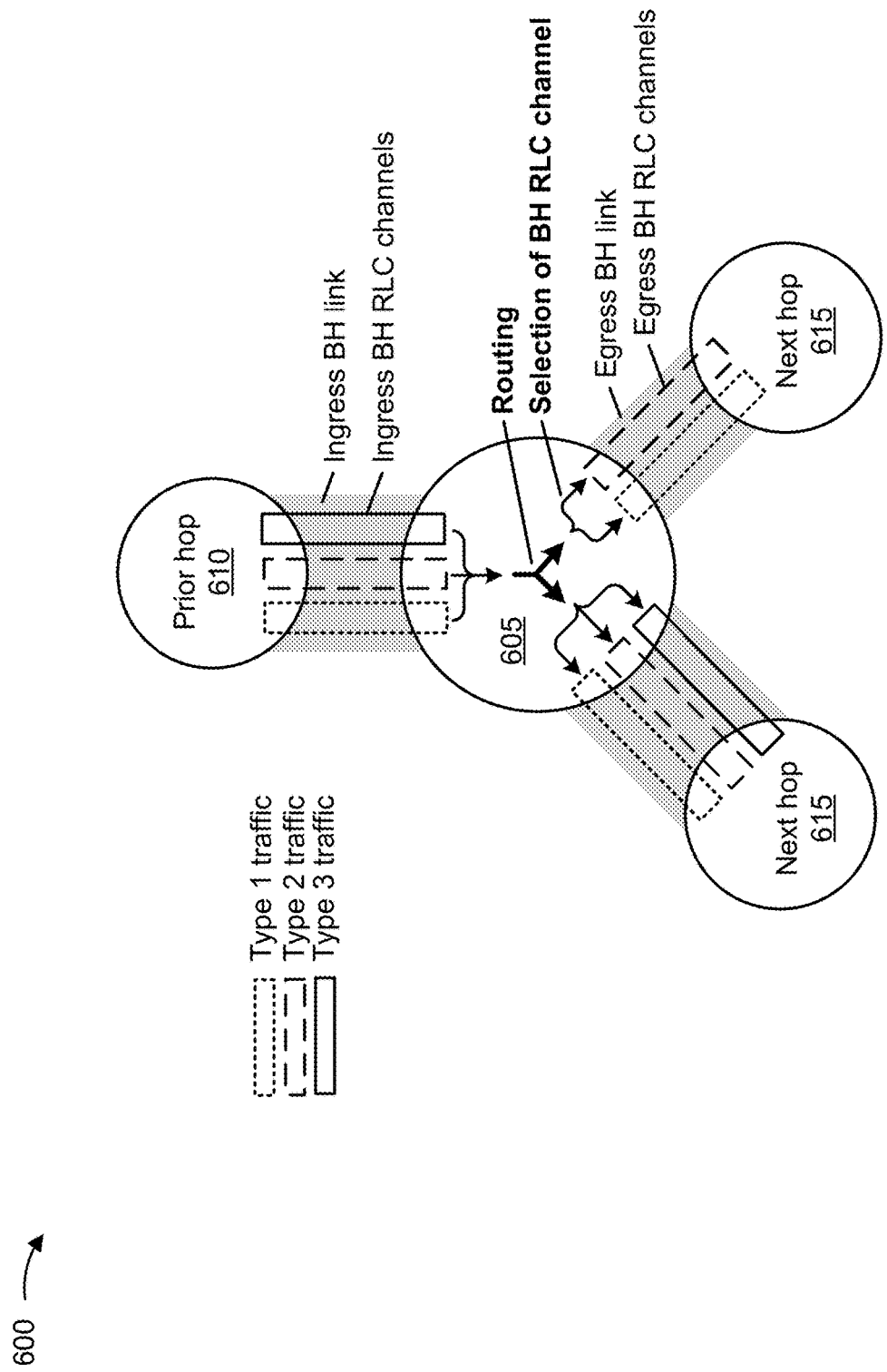
FIG. 6 is a diagram illustrating an example of a radio link control channel configuration for BAP routing, in accordance with the present disclosure.

FIG. 6 is a diagram illustrating an example 600 of an RLC channel configuration for BAP routing, in accordance with the present disclosure. Example 600 illustrates ingress and egress links for a wireless node 605. The wireless node 605 may be on a route associated with BAP routing of packets via a wireless backhaul such as an IAB network. Example 600 also illustrates a wireless node 610 that is a prior hop of the on the route and a pair of wireless nodes 615 that are next hops on the route (e.g., the wireless nodes 615 may be associated with different routes). Each of the wireless nodes 605, 610, and 615 may be, for example, a UE 120, a base station 110, an anchor base station 335, a non-anchor base station 345, an IAB donor 405, an IAB node 410, an IAB donor 505, an IAB node 510, or the like. The wireless nodes 605, 610, and 615 are linked by backhaul (BH) links. For example, a BH link between the wireless node 605 and the wireless node 610 is shown as an ingress BH link (since traffic on the ingress BH link is inbound to the wireless node 605), and BH links between the wireless node 605 and the wireless nodes 615 are shown as egress BH links (since traffic on the egress BH links is outbound from the wireless node 605).

The wireless nodes 605, 610, and 615 may communicate via radio link control (RLC) channels on the various BH links That is, traffic on the ingress link and/or the egress link(s) may be communicated on a BH link via a given RLC channel (herein referred to as a BH RLC channel). A BH RLC channel can be used for transporting (e.g., backhauling) traffic between IAB nodes, or between an IAB donor and an IAB node. A given BH RLC channel may be mapped to one or more UE radio bearers. For example, several UE radio bearers may be multiplexed onto a single BH RLC channel based at least in part on a quality of service (QoS) profile of the UE radio bearers. As another example, a single UE radio bearer may be mapped to a single BH RLC channel, which enables more granular control of QoS profiles and other parameters. Thus, BH RLC channels support backhauling of UE traffic based at least in part on parameters associated with the UE traffic.

In some aspects, a given BH RLC channel is associated with a particular type of traffic. For example, as indicated in FIG. 6, one or more BH RLC channels may be associated with a first type of traffic (Type 1 traffic), one or more BH RLC channels may be associated with a second type of traffic (Type 2 traffic), and one or more BH RLC channels may be associated with a third type of traffic (Type 3 traffic). The type of traffic associated with a given BH RLC channel may include, for example, signaling traffic, best effort traffic, low latency traffic, or another type of traffic. In this way, QoS and traffic prioritization on the backhaul can be enforced through a number of BH RLC channels per backhaul link. Upper layer traffic (e.g., traffic originating from above the RLC layer) may be mapped to a BH RLC channel. For example, upper layer traffic associated with an F1-U interface or an X2-U interface may be mapped at a GTP-U tunnel granularity, upper layer traffic associated with an F1-C interface may be mapped at a granularity of non-UE-associated F1-AP versus UE-associated F1-AP, and non-F1 interface traffic may be mapped at a granularity of a type (e.g., different classes of operations, administration, and management (OAM) traffic). Mapping may occur at an entry point of the traffic to the BAP layer, such as at an access IAB node for uplink traffic or at an IAB donor for downlink traffic. At intermediate hops, egress BH RLC channels may be mapped from ingress BH RLC channels.

In some aspects, wireless node integration with no DU setup, as described herein, may be performed for a wireless node configured with an RLC channel configuration described in association with FIG. 6.

As indicated above, FIG. 6 is provided as an example. Other examples may differ from what is described with regard to FIG. 6.

Figure 7:
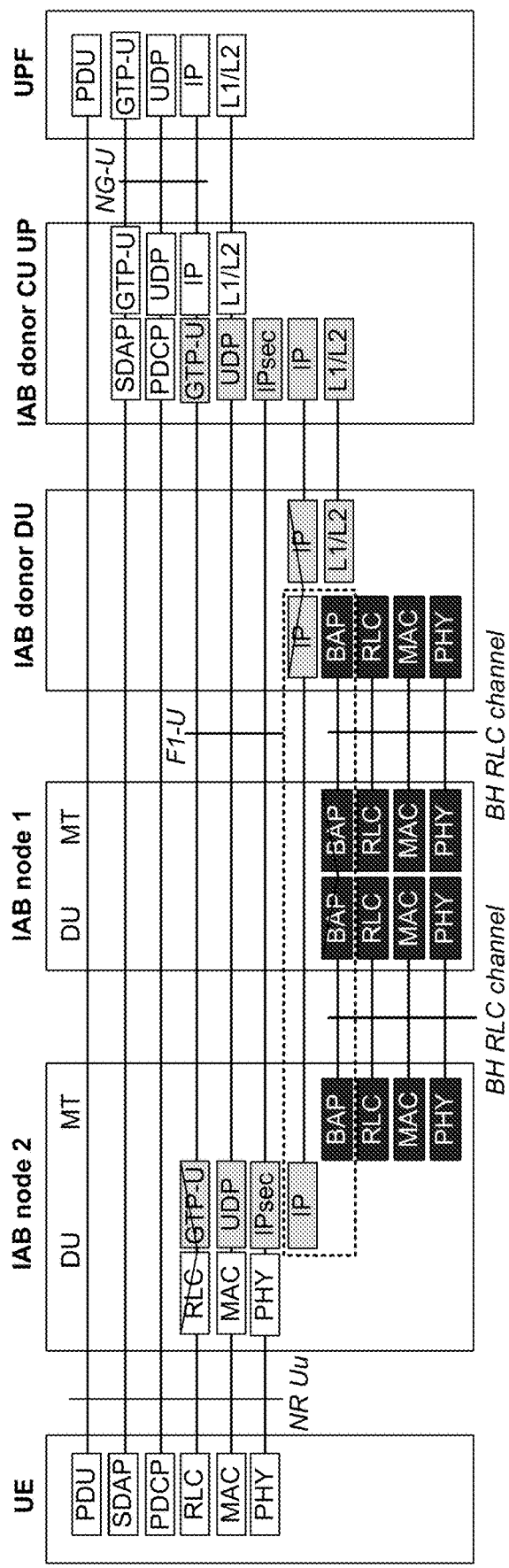
FIG. 7 is a diagram illustrating an example of a user plane (UP) protocol configuration for an IAB network, in accordance with the present disclosure.

FIG. 7 is a diagram illustrating an example 700 of a user plane (UP) protocol configuration for an IAB network, in accordance with the present disclosure. As shown, example 700 includes a UE (e.g., a UE 120), an IAB node 1 (e.g., a non-anchor base station 345, an IAB node 410, an IAB node 510, a wireless node 605, or the like), an IAB node 2 (e.g., a non-anchor base station 345, an IAB node 410, an IAB node 510, a wireless node 605, or the like), an IAB donor DU (e.g., included in an anchor base station 335, a DU of an IAB donor 405, a DU of an IAB donor 505, or the like), an IAB donor CU UP (e.g., included in an anchor base station 335, a CU of IAB donor 405, a CU of an IAB donor 505, or the like), and a user plane function (UPF). The UPF is a component of the 5G core infrastructure system architecture. The UPF may provide interconnection between mobile infrastructure (e.g., the radio access network) and a data network, a protocol data unit (PDU) session anchor point, packet routing and forwarding, application detection, per-flow quality of service (QoS) handling, and traffic usage reporting. As described above, and as illustrated in FIG. 7, the IAB node 1 and the IAB node 2 each include a DU and an MT. In example 700, the IAB node 2 may function as a relay node for the IAB node 1. The IAB donor, the IAB node 1, and the IAB node 2 may be referred to herein as wireless nodes. The IAB node 2 may be an access node for the UE, meaning that the IAB node 2 provides access to the wireless network for the UE.

The UE may have a PDU session, a service data adaptation protocol (SDAP) layer, and a packet data convergence protocol (PDCP) layer for communication with the UPF and/or the IAB donor CU UP. As shown, the UE may also include an RLC layer, a medium access control (MAC) layer, and a physical (PHY) layer for communication with the IAB node 2. As shown, the UE may communicate with the UPF and the IAB node 2 via an NR Uu interface. More generally, the UE may communicate with the UPF and the IAB node 2 via a radio access interface. For example, higher-layer communications originating from the PDU session, the SDAP layer, or the PDCP layer may be communicated to the IAB node 2 via the RLC, MAC, and PHY layers, and may be relayed to the UPF or the IAB donor CU UP via the IAB node 2 and the IAB node 1.

The DU of the IAB node 2 may include an RLC layer, a MAC layer, and a PHY layer for communication with the UE. Furthermore, the DU of the IAB node 2 may include a general packet radio service (GPRS) tunneling protocol (GTP) user (GTP-U) layer, a user datagram protocol (UDP) layer, and an Internet Protocol security (IPSec) layer which is used for configuration and communication with the IAB donor CU UP. The DU of the IAB node 2 may communicate with the IAB donor CU UP via an F1 user plane (F1-U) interface. The F1-U interface may use the same stack as for wireline deployment. The F1-U may be security protected via IPsec (e.g., by the IPsec layer) using a 3GPP network domain security framework (e.g., SA3). The F1-U tunnel may transport traffic of a UE data radio bearer (DRB). The DU of the IAB node 2 may also include an IP layer for communication with the IAB donor DU.

The MTs of the IAB node 1 and the IAB node 2 may include a BAP layer, an RLC layer, a MAC layer, and a PHY layer. The BAP layer may be used for routing of communications (e.g., between the UE and the UPF or the IAB donor CU UP) across the IAB topology. The RLC layer may support acknowledged mode (AM) and unacknowledged mode (UM). The BAP layer may carry an IP layer. For example, the DU may hold an IP address which is routable from the IP layer on the wireless fronthaul. The IAB donor DU may implement an IP routing function, such as via the IAB donor DU's IP layer. IP address management for the BAP layer's IP layer is performed within the RAN. As shown, the IAB node MTs may communicate with their respective parent DUs or donor DUs via backhaul (BH) RLC channels, as described in more detail elsewhere herein.

The IAB donor DU may include an IP layer, a BAP layer, an RLC layer, a MAC layer, and a PHY layer for communication with the IAB node 1 and/or the IAB node 2. Communication between the IAB donor DU and the IAB node 1 may occur via a set of BH RLC channels, as described elsewhere herein. As mentioned above, the IP layer may implement an IP routing function, and the BAP layer may be used for routing across the IAB topology. Furthermore, the IAB donor DU may include an IP layer and one or more Layer 1/Layer 2 (L1/L2) entities for communication with the IAB donor CU UP.

The IAB donor CU UP includes an SDAP layer, a PDCP layer, a GTP-U layer, a UDP layer, an IPSec layer, an IP layer, and one or more L1/L2 entities for radio access communication, such as with the UE and the IAB nodes 1 and 2. Furthermore, the IAB donor CU UP includes a GTP-U layer, a UDP layer, an IP layer, and an L1/L2 entity for communication with the UPF. Communication between the IAB donor CU UP and the UPF may occur via a next generation user plane (NG-U) interface (e.g., via packets encapsulated by the one or more L1/L2 entities).

In some aspects, wireless node integration with no DU setup, as described herein, may be performed for an IAB node that utilizes a UP protocol configuration similar to that described in association with FIG. 7.

As indicated above, FIG. 7 is provided as an example. Other examples may differ from what is described with regard to FIG. 7.

Figure 8:
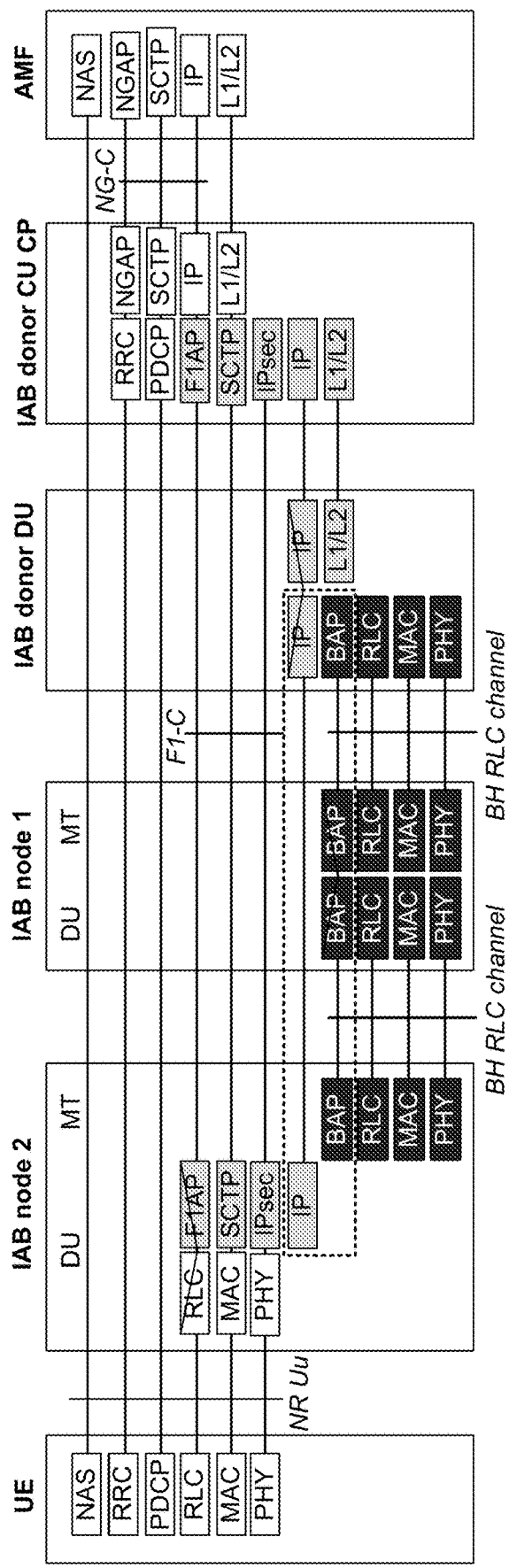
FIG. 8 is a diagram illustrating an example of a control plane (CP) protocol configuration for an IAB network, in accordance with the present disclosure.

FIG. 8 is a diagram illustrating an example 800 of a control plane (CP) protocol configuration for an IAB network, in accordance with the present disclosure. As shown, example 800 includes a UE (e.g., UE 120), an IAB node 1 (e.g., a non-anchor base station 345, an IAB node 410, an IAB node 510, a wireless node 605, or the like), an IAB node 2 (e.g., a non-anchor base station 345, an IAB node 410, an IAB node 510, a wireless node 605, or the like), an IAB donor DU (e.g., included in an anchor base station 335, a DU of an IAB donor 405, a DU of an IAB donor 505, or the like), an IAB donor CU UP (e.g., included in an anchor base station 335, a CU of IAB donor 405, a CU of an IAB donor 505, or the like), and an access and mobility management function (AMF). The AMF may handle connection and mobility management tasks for the UE. As in example 700, the IAB node 2 may function as a relay node for the IAB node 1. The IAB node 2 may be an access node for the UE, meaning that the IAB node 2 provides access to the wireless network for the UE. The BH RLC channels, BAP layers, and IP layers may generally function as described in connection with FIG. 7.

As shown, the UE may include a non-access stratum (NAS) layer, which may communicate with an NAS layer of the AMF via a radio access interface such as an NR Uu interface. Furthermore, the UE may include a radio resource control (RRC) layer and a PDCP layer, which may communicate with the IAB donor CU CP via the radio access interface. The UE may also include an RLC layer, a MAC layer, and a PHY layer, which may communicate with the DU of the IAB node 2 via the radio access interface.

As shown, the DU of the IAB node 2 may include an RLC layer, a MAC layer, and a PHY layer for communication with the UE. Furthermore, the DU of the IAB node 2 may include an F1 application protocol (FLAP) layer, a stream control transmission protocol (SCTP) layer, and an IPSec layer for communication with the IAB donor CU CP via an F1 control plane (F1-C) interface. The F1-C interface may use the same stack as for a wireline deployment. The F1-C interface may be security protected via IPsec or datagram transport layer security (DTLS) using a 3GPP network domain security framework (e.g., SA3). The IAB DU may also include an IP layer for communicating the UE's control traffic with the IAB donor DU (and/or the IAB donor CU CP).

As shown, the IAB node 1 and the IAB node 2 may each include a BAP layer, an RLC layer, a MAC layer, and a PHY layer. The IAB node 1 may use the BAP, RLC, MAC, and PHY layers for communication with the IAB node 2 and with the IAB donor DU. For example, communication between the IAB node 2, the IAB node 1, and the IAB donor DU may occur via BH RLC channels, described elsewhere herein.

As shown, the IAB donor DU may include an IP Layer for communication with the IAB node 2 (e.g., via the IAB node 1) and the IAB donor CU CP. Furthermore, the IAB donor DU may include one or more L1/L2 entities for communication with the IAB donor CU CP.

As shown, the IAB donor CU CP may include an RRC layer and a PDCP layer for communication with the UE. Furthermore, the IAB donor CU CP may include an F1AP layer, an SCTP layer, and an IPSec layer for communication with the IAB node 2, such as via the IAB node 1. As shown, the IAB donor CU CP may include an IP layer and one or more L1/L2 entities for communication with the IAB donor DU. As further shown, the IAB donor CU CP may include a next generation application protocol (NGAP) layer, an SCTP layer, an IP layer, and an L1/L2 entity for communication with the AMF, such as via a next generation control plane (NG-C) interface.

In some aspects, wireless node integration with no DU setup, as described herein, may be performed for a wireless node that utilizes a CP protocol configuration similar to that described in association with FIG. 8.

As indicated above, FIG. 8 is provided as an example. Other examples may differ from what is described with regard to FIG. 8.

Figure 9:
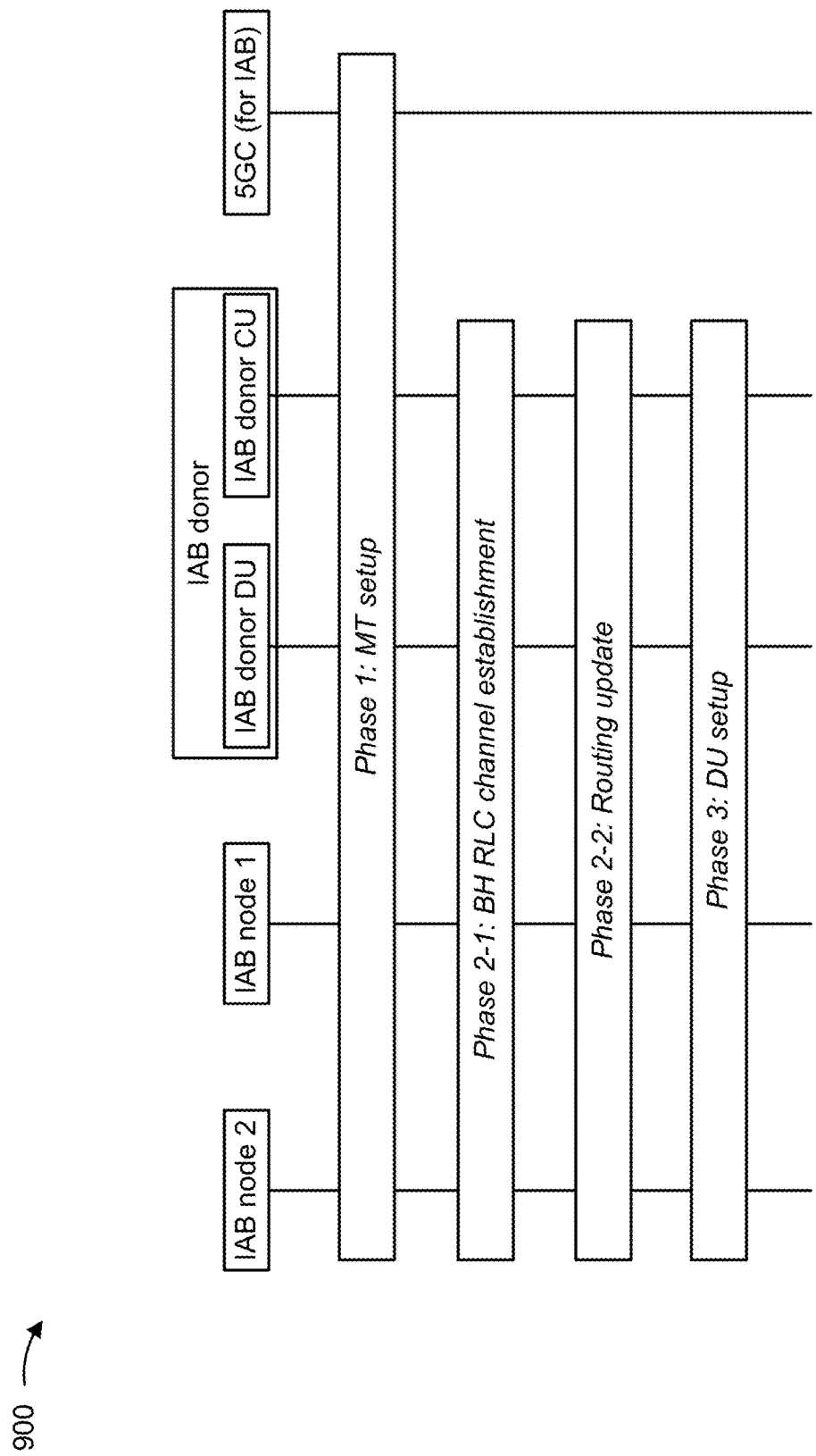
FIG. 9 is a diagram of a conventional process for integrating an IAB node into an IAB network, in accordance with the present disclosure.

FIG. 9 is a diagram illustrating an example 900 of a conventional process for integrating an IAB node into an IAB network. As shown, example 900 includes an IAB node 1 (e.g., a non-anchor base station 345, an IAB node 410, an IAB node 510, a wireless node 605, or the like), an IAB node 2 (e.g., a non-anchor base station 345, an IAB node 410, an IAB node 510, a wireless node 605, or the like), an IAB donor comprising a DU and a CU (e.g., an anchor base station 335, an IAB donor 405, an IAB donor 505, or the like), and a 5G core (5GC) network (e.g., a core network to which the IAB donor provides access). In example 900, the IAB node 2 is being integrated into the IAB network.

As shown in example 900, a first phase in the conventional process for integrating the IAB node 2 into the IAB network is an MT setup. In the first phase, the MT of the IAB node 2 connects to the 5GC network as a UE (e.g., by using radio resource control (RRC) connection setup, authentication, context management, or the like, in a manner similar to that which would be used by a UE for connecting to the 5GC network). In example 900, during the establishment of the connection, the IAB node 2 selects the IAB node 1 as a parent node. The selection of the IAB node 1 as a parent node may be based on indication received (e.g., over-the-air (OTA)) in system information block 1 (SIB1). After connection to the 5GC network, the IAB node 2 provides an indication that the IAB node 2 is IAB-capable to the 5GC network.

As further shown, a first portion of a second phase in the conventional process for integrating the IAB node 2 into the IAB network is BH radio link control (RLC) channel establishment. Here, a default BH RLC channel for non-user-plane (UP) traffic is established during a bootstrapping procedure. In some cases, a setup or modification of a BH RLC channel between the IAB node 1 and the DU of the IAB donor may needed and, in such a case, such a setup or modification is performed during the first portion of the second phase. The CU of the IAB donor may also establish one or more additional BH RLC channels during this phase. Further, the IAB node 2 is allocated a BAP address and a default uplink BAP routing identifier.

As further shown, a second portion of the second phase in the conventional process for integrating the IAB node 2 into the IAB network is a routing update. During this portion of the second phase, a BAP sublayer is updated to support routing between the IAB node 2 and the DU of the IAB donor. Additionally, downlink mapping at the DU of the IAB donor is configured, routing tables are updated at nodes in the IAB network (e.g., the IAB node 1), and an IP address is allocated for the IAB node 2.

As further shown, a third phase in the conventional process for integrating the IAB node 2 into the IAB network is a DU setup. During the third phase, the DU of the IAB node 2 is configured via OAM. The DU of the IAB node 2 then initiates a transport network layer (TNL) establishment and F1 setup. Next, the CU of the IAB donor discovers the co-location of the MT and the DU of the IAB node 2 by including a BAP address in an F1 setup request. The IAB node 2 may then start begin serving UEs In some aspects, wireless node integration with no DU setup, as described herein, may be performed as an alternative to or an improvement of the conventional process for integrating an IAB node into an IAB network described in association with FIG. 9.

As indicated above, FIG. 9 is provided as an example. Other examples may differ from what is described with regard to FIG. 9.

As described above with respect to FIG. 9, a conventional process for integrating a wireless node into an IAB network includes an MT setup phase, a BH RLC channel establishment/routing update phase, and a DU setup phase. However, there are scenarios in which a wireless node may not instantiate a DU, but routing over IP/BAP would be beneficial.

One such scenario is a scenario where IAB IP/BAP backhaul transport is used as an alternative means to provide PDU session connectivity to carry non-F1 traffic. In such a case, the DU of an IAB donor may serve as a first-hop router within a RAN (rather than a UPF serving as a first-hop router in a core network). Here, there is no need to transport CP traffic over a UP (e.g., as is the case for PDU session connectivity). One particular example of such a scenario is a scenario in which a wireless node takes the form of a 5G customer-premises-equipment (CPE) that is used to transfer non-F1 traffic over IP over BAP. Another particular example of such a scenario is a scenario in which the wireless node takes the form of a repeater (e.g., a "smart" repeater) that is used to transfer open RAN (ORAN) traffic over IP over BAP. Another particular example of a such a scenario is a factory automation scenario in which traffic associated with wireless nodes taking the form of programmable logic controllers (PLCs) or sensor/actuators (SAs) is communicated over IP over BAP. An issue with using IAB IP/BAP backhaul transport for carrying non-F1 traffic is that a BAP configuration is conventionally provided over an F1 interface. However, DU instantiation is required to provide a BAP configuration over an F1 interface. Thus, in a case in which a wireless node does not instantiate a DU, such as in the example scenarios provided above, providing the wireless node with a BAP configuration is not possible and, therefore, IAB IP/BAP backhaul transport cannot be used to communicate non-F1 traffic.

Another scenario in which a wireless node may not instantiate a DU, but in which routing over IP/BAP would be beneficial, is a multi-hop sidelink scenario. In such a scenario, multi-hop relaying is performed among wireless nodes in the form of sidelink-capable UEs. BAP transport can provide a solution for L2 relaying in such a scenario (e.g., by replacing a sidelink adaptation layer or by co-existing with the sidelink adaptation layer). However, as noted above, DU instantiation is required to provide a BAP configuration over an F1 interface. Thus, because a sidelink-capable UE would not instantiate a DU over an F1 interface, providing the sidelink-capable UE with a BAP configuration is not possible and, therefore, IAB IP/BAP backhaul cannot be used to enable multi-hop sidelink.

Some techniques and apparatuses described herein enable wireless node integration with no DU setup. In some aspects, to enable wireless node integration with no DU setup, a wireless node may establish a connection with a base station. In some aspects, after establishing the connection with the base station, the wireless node may provide an indication that the wireless node has backhauling capability to the base station. The base station may receive the indication and may transmit a backhauling configuration to the wireless node over the connection, accordingly. Additional details are provided below. In this way, routing over IP/BAP can be supported in a scenario in which a wireless node does not instantiate a DU, thereby enabling traffic to be routed over IP over BAP in a variety of scenarios such as those described above.

Figure 10:
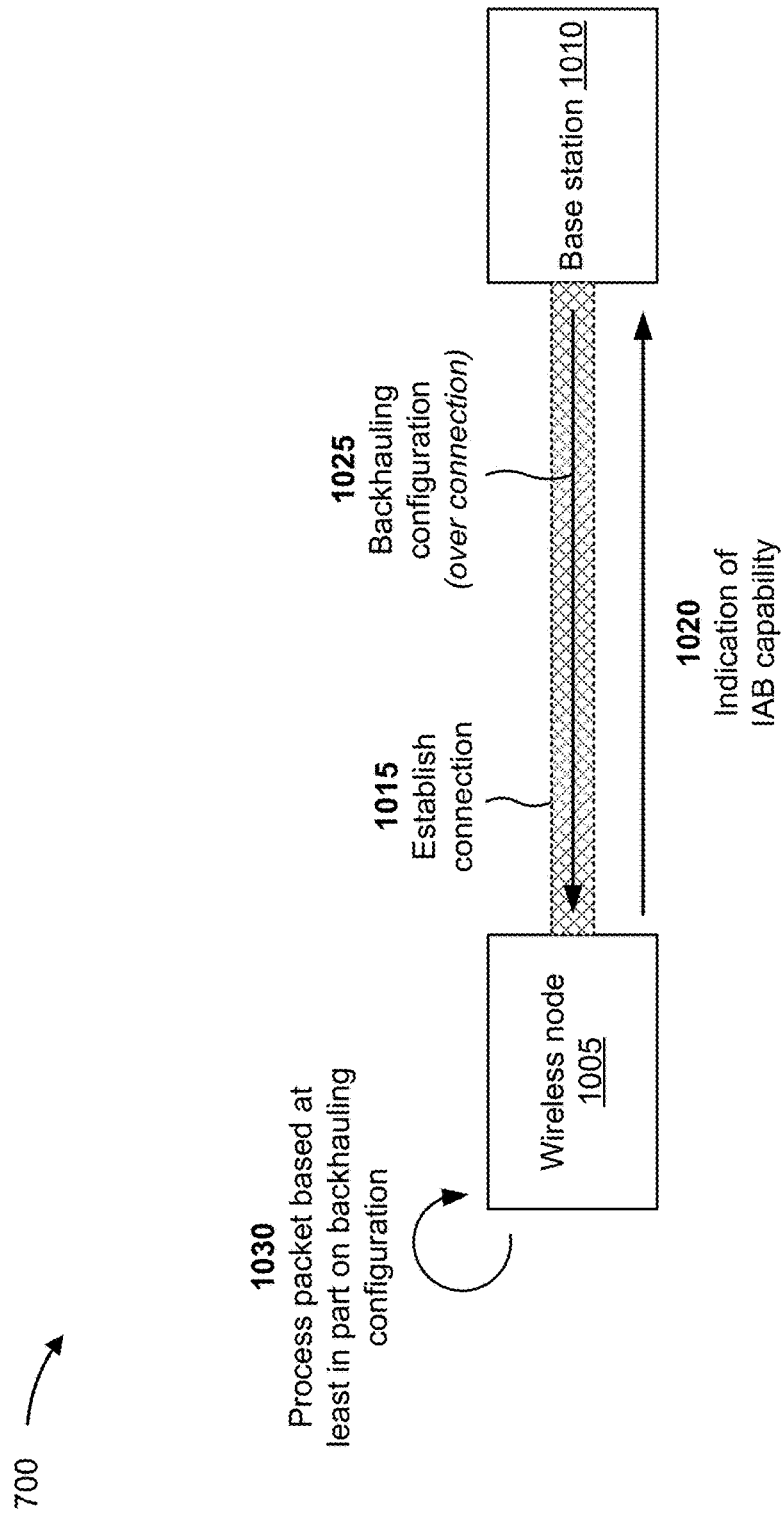
FIG. 10 is a diagram illustrating an example associated with wireless node integration with no distributed unit (DU) setup, in accordance with the present disclosure.

FIG. 10 is a diagram illustrating an example 1000 associated with wireless node integration with no DU setup, in accordance with the present disclosure.

As shown in FIG. 10, example 1000 includes communication among a wireless node 1005 and a base station 1010. The base station 1010 may include, for example, a base station 110, an anchor base station 335, an IAB donor 405, an IAB donor 505, an IAB node 510, a wireless node 610, or another type of wireless communication device. The wireless node 1005 may include, for example, a UE 120, a base station 110, an anchor base station 335, a non-anchor base station 345, an IAB donor 405, an IAB node 410, an IAB donor 505, an IAB node 510, a wireless node 605, a wireless node 610, a wireless node 615, or another type of wireless communication device, such as a repeater (e.g., a wireless communication device configured to receive and forward traffic).

As shown in FIG. 10 by reference 1015, the wireless node 1005 and the base station 1010 may establish a connection (e.g., to enable communication between the wireless node 1005 and the base station 1010). In some aspects, the connection is an RRC connection. That is, in some aspects, the wireless node 1005 and the base station 1010 may establish an RRC connection to enable communication between the wireless node 1005 and the base station 1010. In some aspects, the wireless node 1005 may initiate the establishment of the connection between the wireless node 1005 and the base station 1010. Alternatively, in some aspects, the base station 1010 may initiate the establishment of the connection between the wireless node 1005 and the base station 1010.

As shown by reference 1020, the wireless node 1005 may provide, and the base station 1010 may receive, an indication that the wireless node 1005 has backhauling capability. In some aspects, the indication comprises an indication that the wireless node 1005 supports BAP processing. That is, in some aspects, the indication may be an indication of a capability of the wireless node 1005 to support BAP processing. In some aspects, the wireless node 1005 may provide, and the base station 1010 may receive, the indication over the connection established between the wireless node 1005 and the base station 1010. Notably, the backhauling configuration is not provided over an F1 interface in example 1000 (e.g., since no DU was set up for the wireless node 1005).

In some aspects, the indication is associated with receiving a BAP configuration over an RRC connection. That is, in some aspects, the indication may be an indication that the wireless node 1005 is to receive a BAP configuration over an RRC connection (e.g., over the connection that was established between the wireless node 1005 and the base station 1010).

In some aspects, when the indication is associated with receiving a BAP configuration over an RRC connection, the indication is a first indication and the wireless node 1005 may provide, and the base station 1010 may receive, a second indication. In some aspects, the second indication may indicate that the wireless node 1005 has IAB capability. That is, in some aspects, the indication may be a first indication, and the wireless node 1005 may provide a second indication to the base station 1010 indicating that the wireless node 1005 is IAB capable. Additionally, or alternatively, the second indication may indicate that the wireless node 1005 has sidelink capability or sidelink relaying capability. That is, in some aspects, the indication may be a first indication, and the wireless node 1005 may provide a second indication to the base station 1010 indicating that the wireless node 1005 is sidelink-capable (e.g., capable of communicating with other wireless nodes 1005 over sidelink connections) or is sidelink-relaying-capable (e.g., capable of relaying traffic received from other wireless nodes 1005 over sidelink connections).

In some aspects, the indication may indicate that the wireless node 1005 has IAB capability and non-F1 capability. That is, in some aspects, the indication may be an indication of IAB capability of the wireless node 1005 plus an indication that the wireless node 1005 is non-F1 capable. Additionally, or alternatively, the indication may indicate that the wireless node has IAB capability and that the wireless node 1005 will not establish a connection with the base station 1010 via an F1 interface. That is, in some aspects, the indication may be an indication of IAB capability of the wireless node 1005 plus an indication that the wireless node 1005 will not establish an F1 connection to the base station 1010 (e.g., even though the wireless node 1005 may be F1-capable).

In some aspects, the indication includes a request to receive a backhauling configuration via RRC signaling That is, in some aspects, the indication may include a request for the base station 1010 to provide a backhauling configuration via RRC signaling to the wireless node 1005.

As shown by reference 1025, the base station 1010 may transmit, to the wireless node 1005 and over the connection, a backhauling configuration. In some aspects, the base station 1010 may transmit the backhauling configuration based at least in part on receiving the indication that the wireless node 1005 has backhauling capability. In some aspects, the backhauling configuration is a BAP configuration.

In some aspects, the backhauling configuration includes a destination address allocation associated with the wireless node 1005, a default routing identifier allocation associated with the wireless node 1005, a routing configuration, a channel mapping configuration, or another type of configuration to be utilized by the wireless node 1005 in association with performing backhaul operations.

In some aspects, the base station 1010 may transmit, and the wireless node 1005 may receive, an address allocation (e.g., an IP address allocation). In some aspects, the address may be allocated to the wireless node 1005 based at least in part on the indication being received by the base station 1010.

In some aspects, the base station 1010 may perform an authorization of the wireless node 1005 with a core network as a backhauling capable node based at least in part on the indication. That is, in some aspects, the indication may trigger the base station 1010 to perform authorization of the wireless node 1005 with the core network as a backhauling-capable node.

In some aspects, the base station 1010 may perform an authorization of the wireless node 1005 with the core network as an IAB node based at least in part on the indication. That is, in some aspects, the indication may trigger the base station 1010 to perform authorization of the wireless node 1005 with the core network as an IAB node As shown by reference 1030, the wireless node 1005 may process a packet based at least in part on the backhauling configuration. That is, the wireless node 1005 may receive a packet and may perform IP/BAP backhaul operations according to the backhauling configuration.

In this way, routing over IP/BAP can be supported in a scenario in which a DU is not instantiated at the wireless node 1005. As a result, IAB IP/BAP backhaul transport can be used to communicate non-F1 traffic, IAB IP/BAP backhaul can be used to enable multi-hop sidelink, or the like.

As indicated above, FIG. 10 is provided as an example. Other examples may differ from what is described with respect to FIG. 10.

Figure 11:
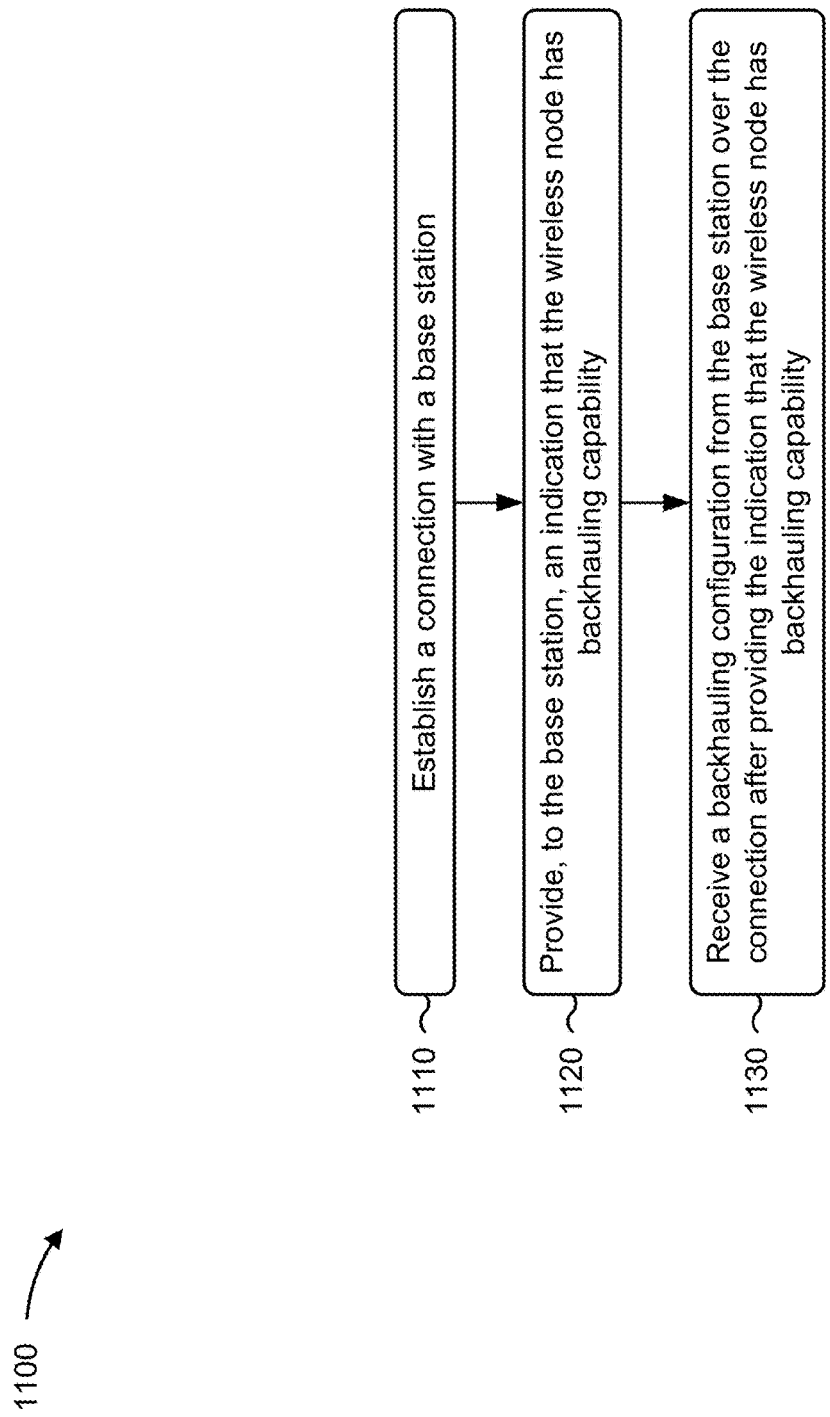
FIGS. 11 and 12 are diagrams illustrating example processes associated with wireless node integration with no DU setup, in accordance with the present disclosure.

FIG. 11 is a diagram illustrating an example process 1100 performed, for example, by a wireless node, in accordance with the present disclosure. Example process 1100 is an example where the wireless node (e.g., wireless node 1005) performs operations associated with wireless node integration with no DU setup.

As shown in FIG. 11, in some aspects, process 1100 may include establishing a connection with a base station (block 1110). For example, the wireless node (e.g., using communication manager 140 and/or connection component 1308, depicted in FIG. 13) may establish a connection with a base station, as described above.

As further shown in FIG. 11, in some aspects, process 1100 may include providing, to the base station, an indication that the wireless node has backhauling capability (block 1120). For example, the wireless node (e.g., using communication manager 140 and/or backhauling component 1310 or transmission component 1304, depicted in FIG. 13) may provide, to the base station, an indication that the wireless node has backhauling capability, as described above.

As further shown in FIG. 11, in some aspects, process 1100 may include receiving a backhauling configuration from the base station over the connection after providing the indication that the wireless node has backhauling capability (block 1130). For example, the wireless node (e.g., using communication manager 140 and/or reception component 1302, depicted in FIG. 13) may receive a backhauling configuration from the base station over the connection after providing the indication that the wireless node has backhauling capability, as described above.

Process 1100 may include additional aspects, such as any single aspect or any combination of aspects described below and/or in connection with one or more other processes described elsewhere herein.

In a first aspect, the wireless node is a user equipment.

In a second aspect, alone or in combination with the first aspect, the wireless node is an IAB node.

In a third aspect, alone or in combination with one or more of the first and second aspects, the wireless node is a repeater.

In a fourth aspect, alone or in combination with one or more of the first through third aspects, the connection is an RRC connection.

In a fifth aspect, alone or in combination with one or more of the first through fourth aspects, the indication comprises an indication that the wireless node supports BAP processing.

In a sixth aspect, alone or in combination with one or more of the first through fifth aspects, the indication is associated with receiving a BAP configuration over an RRC connection.

In a seventh aspect, alone or in combination with one or more of the first through sixth aspects, the indication is a first indication, and process 1100 includes providing a second indication to the base station, the second indication indicating that the wireless node has IAB capability.

In an eighth aspect, alone or in combination with one or more of the first through seventh aspects, the indication is a first indication, and process 1100 includes providing a second indication to the base station, the second indication indicating that the wireless node has sidelink capability or sidelink relaying capability.

In a ninth aspect, alone or in combination with one or more of the first through eighth aspects, the indication indicates that the wireless node has IAB capability and non-F1 capability.

In a tenth aspect, alone or in combination with one or more of the first through ninth aspects, the indication indicates that the wireless node has IAB capability and that the wireless node will not establish a connection with the base station via an F1 interface.

In an eleventh aspect, alone or in combination with one or more of the first through tenth aspects, the indication includes a request to receive the backhauling configuration via RRC signaling.

In a twelfth aspect, alone or in combination with one or more of the first through eleventh aspects, the backhauling configuration includes a BAP configuration.

In a thirteenth aspect, alone or in combination with one or more of the first through twelfth aspects, the backhauling configuration includes at least one of a destination address allocation, a default routing identifier allocation, a routing configuration, or a channel mapping configuration.

In a fourteenth aspect, alone or in combination with one or more of the first through thirteenth aspects, process 1100 includes receiving an address allocation after providing the indication.

In a fifteenth aspect, alone or in combination with one or more of the first through fourteenth aspects, process 1100 includes processing a packet based at least in part on the backhauling configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
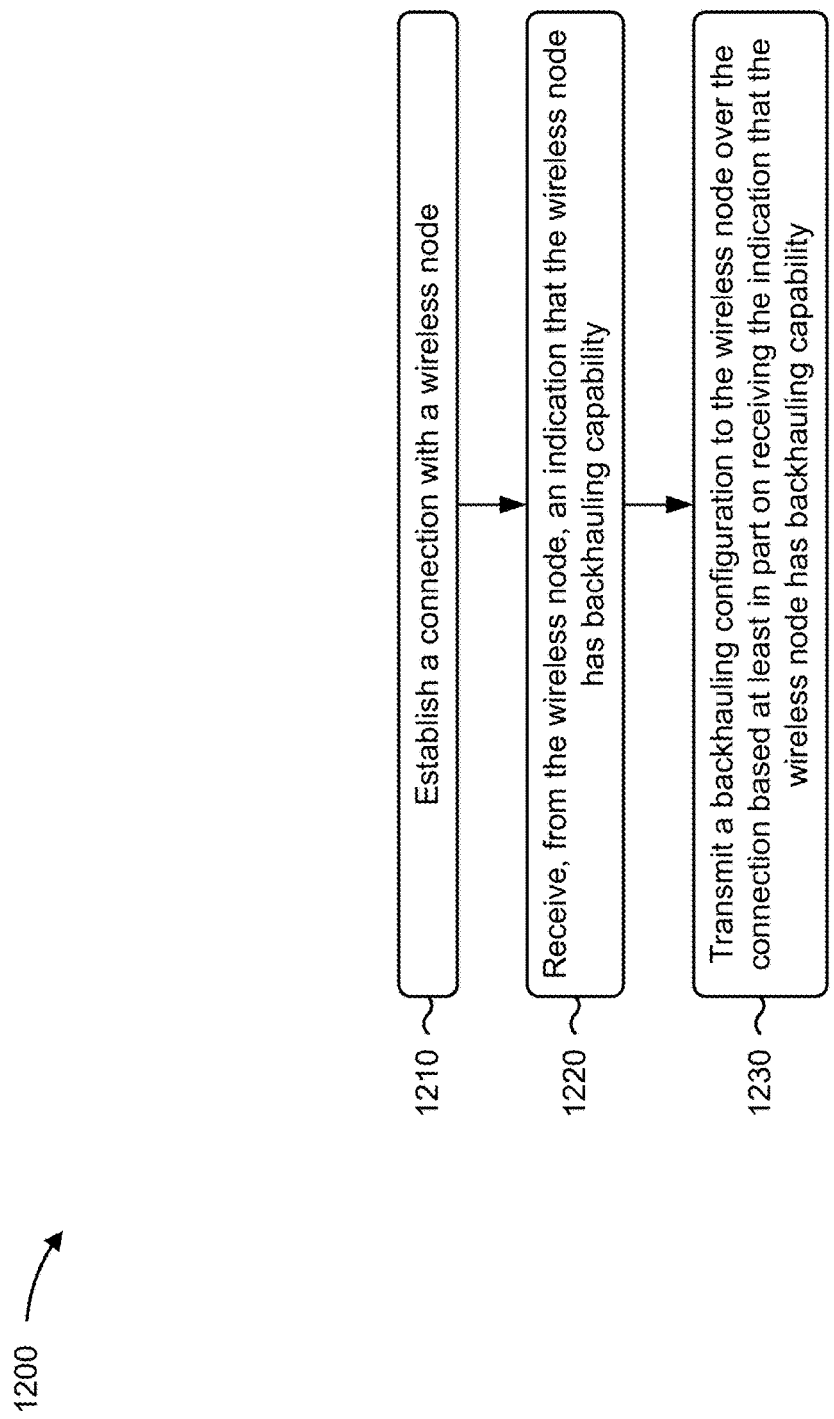

FIG. 12 is a diagram illustrating an example process 1200 performed, for example, by a base station, in accordance with the present disclosure. Example process 1200 is an example where the base station (e.g., base station 110) performs operations associated with wireless node integration with no DU setup.

As shown in FIG. 12, in some aspects, process 1200 may include establishing a connection with a wireless node (block 1210). For example, the base station (e.g., using communication manager 150 and/or connection component 1408, depicted in FIG. 14) may establish a connection with a wireless node, as described above.

As further shown in FIG. 12, in some aspects, process 1200 may include receiving, from the wireless node, an indication that the wireless node has backhauling capability (block 1220). For example, the base station (e.g., using communication manager 150 and/or reception component 1402, depicted in FIG. 14) may receive, from the wireless node, an indication that the wireless node has backhauling capability, as described above.

As further shown in FIG. 12, in some aspects, process 1200 may include transmitting a backhauling configuration to the wireless node over the connection based at least in part on receiving the indication that the wireless node has backhauling capability (block 1230). For example, the base station (e.g., using communication manager 150 and/or backhauling configuration component 1410 or transmission component 1404, depicted in FIG. 14) may transmit a backhauling configuration to the wireless node over the connection based at least in part on receiving the indication that the wireless node has backhauling capability, as described above.

Process 1200 may include additional aspects, such as any single aspect or any combination of aspects described below and/or in connection with one or more other processes described elsewhere herein.

In a first aspect, the wireless node is a user equipment.

In a second aspect, alone or in combination with the first aspect, the wireless node is an IAB node.

In a third aspect, alone or in combination with one or more of the first and second aspects, the wireless node is a repeater.

In a fourth aspect, alone or in combination with one or more of the first through third aspects, the connection is an RRC connection.

In a fifth aspect, alone or in combination with one or more of the first through fourth aspects, the indication comprises an indication that the wireless node supports BAP processing.

In a sixth aspect, alone or in combination with one or more of the first through fifth aspects, the indication is associated with receiving a BAP configuration over an RRC connection.

In a seventh aspect, alone or in combination with one or more of the first through sixth aspects, the indication is a first indication, and process 1200 includes receiving a second indication from the wireless node, the second indication indicating that the wireless node has IAB capability.

In an eighth aspect, alone or in combination with one or more of the first through seventh aspects, the indication is a first indication, and process 1200 includes receiving a second indication from the wireless node, the second indication indicating that the wireless node has sidelink capability or sidelink relaying capability.

In a ninth aspect, alone or in combination with one or more of the first through eighth aspects, the indication indicates that the wireless node has IAB capability and non-F1 capability.

In a tenth aspect, alone or in combination with one or more of the first through ninth aspects, the indication indicates that the wireless node has IAB capability and that the wireless node will not establish a connection with the base station via an F1 interface.

In an eleventh aspect, alone or in combination with one or more of the first through tenth aspects, the indication includes a request to provide the backhauling configuration via RRC signaling.

In a twelfth aspect, alone or in combination with one or more of the first through eleventh aspects, the backhauling configuration includes a BAP configuration.

In a thirteenth aspect, alone or in combination with one or more of the first through twelfth aspects, the backhauling configuration includes at least one of a destination address allocation, a default routing identifier allocation, a routing configuration, or a channel mapping configuration.

In a fourteenth aspect, alone or in combination with one or more of the first through thirteenth aspects, process 1200 includes transmitting an address allocation based at least in part on the indication.

In a fifteenth aspect, alone or in combination with one or more of the first through fourteenth aspects, process 1200 includes performing an authorization of the wireless node with a core network as a backhauling capable node based at least in part on the indication.

In a sixteenth aspect, alone or in combination with one or more of the first through fifteenth aspects, process 1200 includes performing an authorization of the wireless node with a core network as an IAB node based at least in part on the indication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
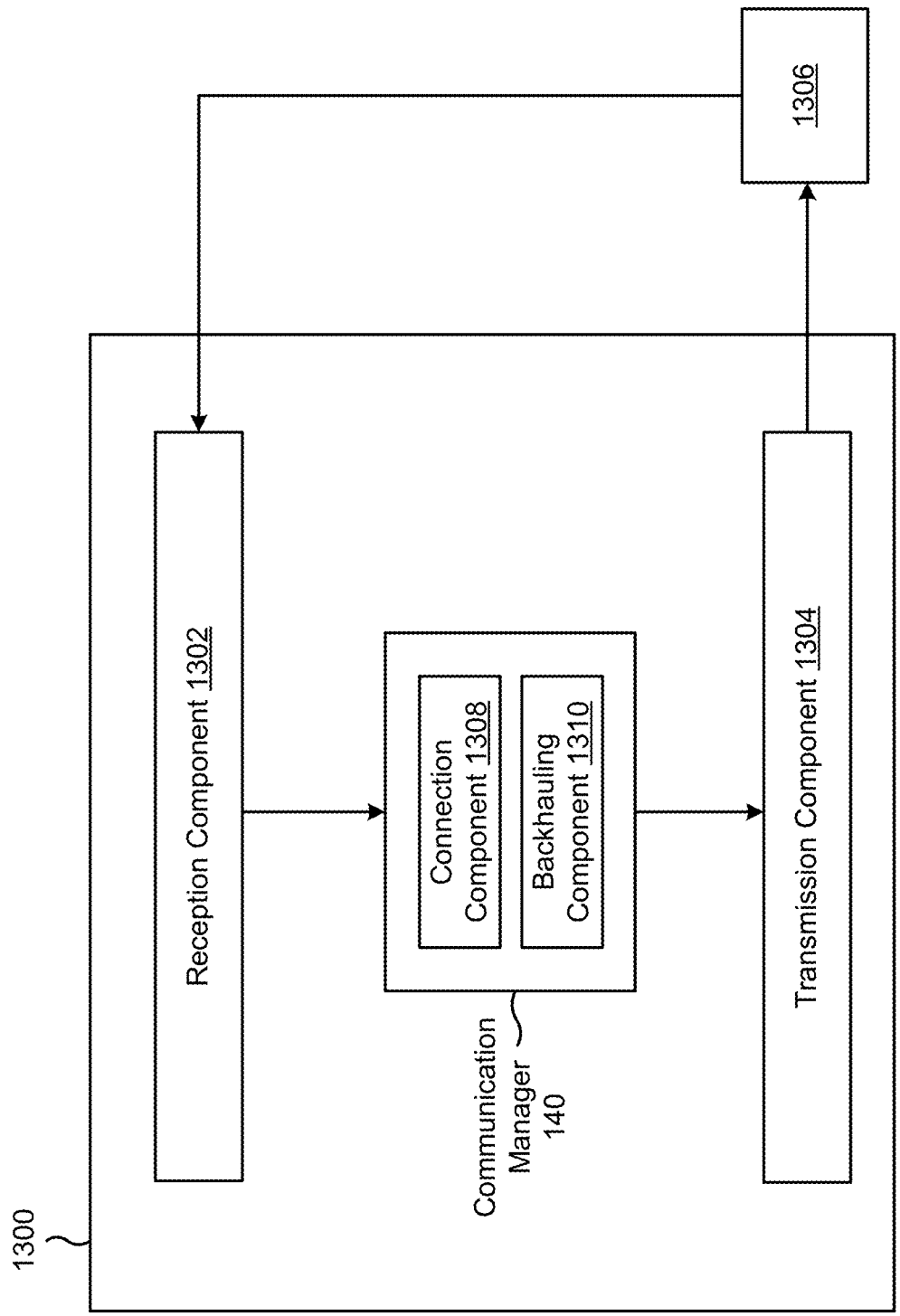
FIGS. 13 and 14 are diagrams of example apparatuses for wireless communication, in accordance with the present disclosure.

FIG. 13 is a diagram of an example apparatus 1300 for wireless communication. The apparatus 1300 may be a wireless node, or a wireless node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140) may include a connection component 1308 or a backhauling component 1310, among other examples.

In some aspects, the apparatus 1300 may be configured to perform one or more operations described herein in connection with FIG. 10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the wireless node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the wireless node described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the wireless node described in connection with FIG. 2. In some aspects, the transmission component 1304 may be co-located with the reception component 1302 in a transceiver.

The connection component 1308 may establish a connection with a base station. The backhauling component 1310 may provide, or may cause the transmission component 1304 to provide, to the base station, an indication that the wireless node has backhauling capability. The reception component 1302 may receive a backhauling configuration from the base station over the connection after providing the indication that the wireless node has backhauling capability.

The reception component 1302 may receive an address allocation after providing the indication.

The backhauling component 1310 may process a packet based at least in part on the backhauling configuration.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
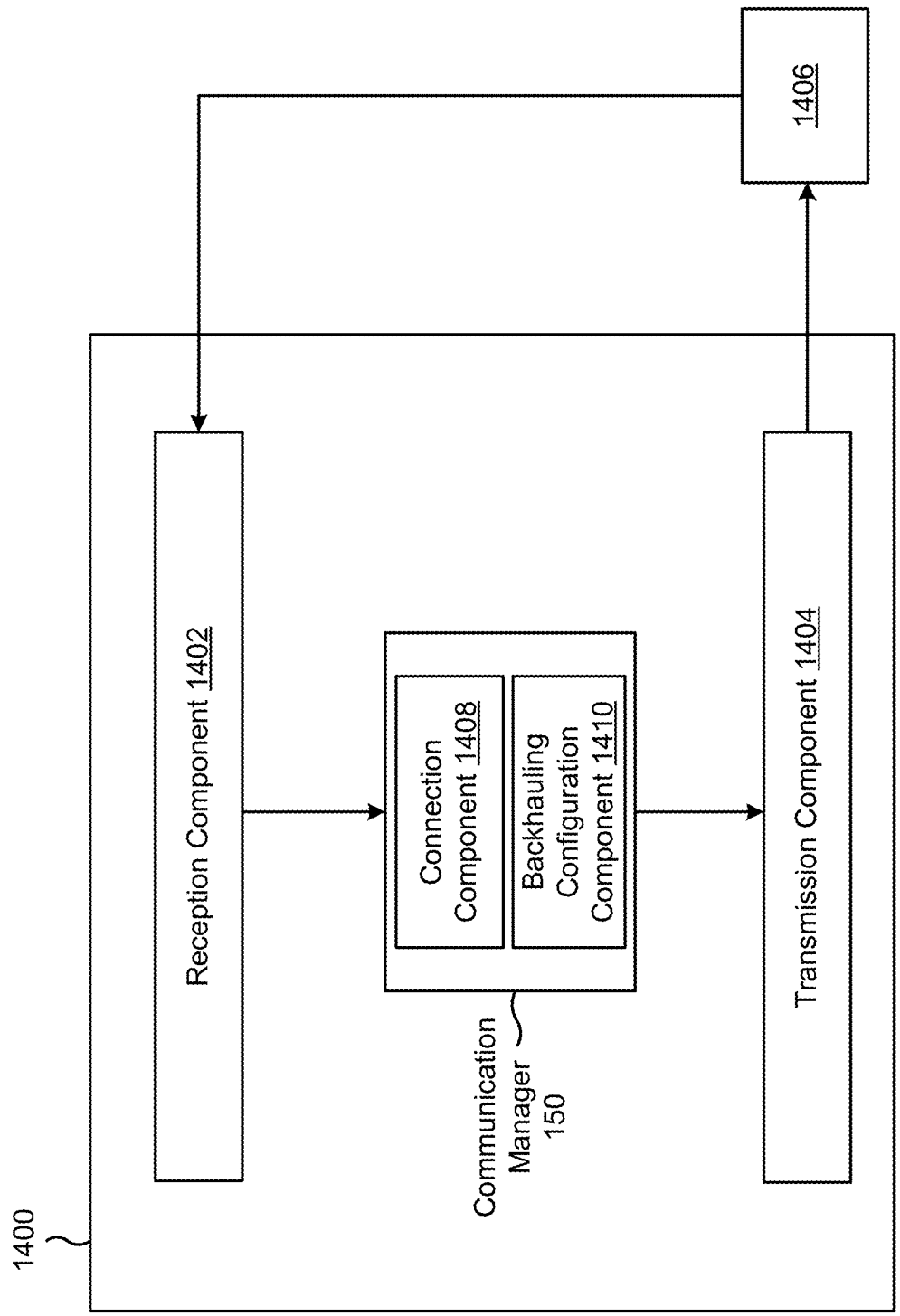

FIG. 14 is a diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include one or more of a connection component 1408 or a backhauling configuration component 1410, among other examples.

In some aspects, the apparatus 1400 may be configured to perform one or more operations described herein in connection with FIG. 10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The connection component 1408 may establish a connection with a wireless node. The reception component 1402 may receive, from the wireless node, an indication that the wireless node has backhauling capability. The backhauling configuration component 1410 may transmit, or may cause the transmission component 1404 to transmit, a backhauling configuration to the wireless node over the connection based at least in part on receiving the indication that the wireless node has backhauling capability.

The backhauling configuration component 1410 may transmit, or may cause the transmission component 1404 to transmit, an address allocation based at least in part on the indication.

The backhauling configuration component 1410 may perform an authorization of the wireless node with a core network as a backhauling capable node based at least in part on the indication.

The backhauling configuration component 1410 may perform an authorization of the wireless node with a core network as an IAB node based at least in part on the indication.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a wireless node, comprising: establishing a connection with a base station; providing, to the base station, an indication that the wireless node has backhauling capability; and receiving a backhauling configuration from the base station over the connection after providing the indication that the wireless node has backhauling capability.

Aspect 2: The method of Aspect 1, wherein the wireless node is a user equipment.

Aspect 3: The method of Aspect 1, wherein the wireless node is an IAB node.

Aspect 4: The method of Aspect 1, wherein the wireless node is a repeater.

Aspect 5: The method of any of Aspects 1-4, wherein the connection is an RRC connection.

Aspect 6: The method of any of Aspects 1-5, wherein the indication comprises an indication that the wireless node supports BAP processing.

Aspect 7: The method of Aspect 6, wherein the indication is associated with receiving a BAP configuration over an RRC connection.

Aspect 8: The method of any of Aspects 6-7, wherein the indication is a first indication, and the method further comprises providing a second indication to the base station, the second indication indicating that the wireless node has IAB capability.

Aspect 9: The method of any of Aspects 6-8, wherein the indication is a first indication, and the method further comprises providing a second indication to the base station, the second indication indicating that the wireless node has sidelink capability or sidelink relaying capability.

Aspect 10: The method of any of Aspects 1-9, wherein the indication indicates that the wireless node has IAB capability and non-F1 capability.

Aspect 11: The method of any of Aspects 1-10, wherein the indication indicates that the wireless node has IAB capability and that the wireless node will not establish a connection with the base station via an F1 interface.

Aspect 12: The method of any of Aspects 1-11, wherein the indication includes a request to receive the backhauling configuration via RRC signaling.

Aspect 13: The method of any of Aspects 1-12, wherein the backhauling configuration includes a BAP configuration.

Aspect 14: The method of any of Aspects 1-13, wherein the backhauling configuration includes at least one of a destination address allocation, a default routing identifier allocation, a routing configuration, or a channel mapping configuration.

Aspect 15: The method of any of Aspects 1-14, further comprising receiving an address allocation after providing the indication.

Aspect 16: The method of any of Aspects 1-15, further comprising processing a packet based at least in part on the backhauling configuration.

Aspect 17: A method of wireless communication performed by a base station, comprising: establishing a connection with a wireless node; receiving, from the wireless node, an indication that the wireless node has backhauling capability; and transmitting a backhauling configuration to the wireless node over the connection based at least in part on receiving the indication that the wireless node has backhauling capability.

Aspect 18: The method of Aspect 17, wherein the wireless node is a user equipment.

Aspect 19: The method of Aspect 17, wherein the wireless node is an IAB node.

Aspect 20: The method of Aspect 17, wherein the wireless node is a repeater.

Aspect 21: The method of any of Aspects 17-20, wherein the connection is an RRC connection.

Aspect 22: The method of any of Aspects 17-21, wherein the indication comprises an indication that the wireless node supports BAP processing.

Aspect 23: The method of Aspect 22, wherein the indication is associated with receiving a BAP configuration over an RRC connection.

Aspect 24: The method of any of Aspects 22-23, wherein the indication is a first indication, and the method further comprises receiving a second indication from the wireless node, the second indication indicating that the wireless node has IAB capability.

Aspect 25: The method of any of Aspects 22-24, wherein the indication is a first indication, and the method further comprises receiving a second indication from the wireless node, the second indication indicating that the wireless node has sidelink capability or sidelink relaying capability.

Aspect 26: The method of any of Aspects 17-25, wherein the indication indicates that the wireless node has IAB capability and non-F1 capability.

Aspect 27: The method of any of Aspects 17-26, wherein the indication indicates that the wireless node has IAB capability and that the wireless node will not establish a connection with the base station via an F1 interface.

Aspect 28: The method of any of Aspects 17-27, wherein the indication includes a request to provide the backhauling configuration via RRC signaling.

Aspect 29: The method of any of Aspects 17-28, wherein the backhauling configuration includes a BAP configuration.

Aspect 30: The method of any of Aspects 17-29, wherein the backhauling configuration includes at least one of a destination address allocation, a default routing identifier allocation, a routing configuration, or a channel mapping configuration.

Aspect 31: The method of any of Aspects 17-30, further comprising transmitting an address allocation based at least in part on the indication.

Aspect 32: The method of any of Aspects 17-31, further comprising performing an authorization of the wireless node with a core network as a backhauling capable node based at least in part on the indication.

Aspect 33: The method of any of Aspects 17-32, further comprising performing an authorization of the wireless node with a core network as an IAB node based at least in part on the indication.

Aspect 34: An apparatus for wireless communication at a device, comprising a processor; memory coupled with the processor; and instructions stored in the memory and executable by the processor to cause the apparatus to perform the method of one or more of Aspects 1-16.

Aspect 35: A device for wireless communication, comprising a memory and one or more processors coupled to the memory, the one or more processors configured to perform the method of one or more of Aspects 1-16.

Aspect 36: An apparatus for wireless communication, comprising at least one means for performing the method of one or more of Aspects 1-16.

Aspect 37: A non-transitory computer-readable medium storing code for wireless communication, the code comprising instructions executable by a processor to perform the method of one or more of Aspects 1-16.

Aspect 38: A non-transitory computer-readable medium storing a set of instructions for wireless communication, the set of instructions comprising one or more instructions that, when executed by one or more processors of a device, cause the device to perform the method of one or more of Aspects 1-16.

Aspect 39: An apparatus for wireless communication at a device, comprising a processor; memory coupled with the processor; and instructions stored in the memory and executable by the processor to cause the apparatus to perform the method of one or more of Aspects 17-33.

Aspect 40: A device for wireless communication, comprising a memory and one or more processors coupled to the memory, the one or more processors configured to perform the method of one or more of Aspects 17-33.

Aspect 41: An apparatus for wireless communication, comprising at least one means for performing the method of one or more of Aspects 17-33.

Aspect 42: A non-transitory computer-readable medium storing code for wireless communication, the code comprising instructions executable by a processor to perform the method of one or more of Aspects 17-33.

Aspect 43: A non-transitory computer-readable medium storing a set of instructions for wireless communication, the set of instructions comprising one or more instructions that, when executed by one or more processors of a device, cause the device to perform the method of one or more of Aspects 17-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
   one or more memories; and
   one or more processors, coupled to the one or more memories, configured to:
      establish a radio resource control (RRC) connection with a base station;
      provide, to the base station, an indication that the wireless node has backhauling capability, wherein the indication includes a request to receive a backhaul adaptation protocol (BAP) configuration via the RRC connection, and
wherein the indication indicates that:
the wireless node has integrated access and backhaul (IAB) capability, and
the wireless node will not establish a connection with the base station via an F1 interface; and
receive the BAP configuration from the base station over the RRC connection after providing the indication that the wireless node has backhauling capability.

2. The wireless node of claim 1, wherein the wireless node is a user equipment.

3. The wireless node of claim 1, wherein the wireless node is an IAB node.

4. The wireless node of claim 1, wherein the wireless node is a repeater.

5. The wireless node of claim 1, wherein the indication comprises an indication that the wireless node supports BAP processing.

6. The wireless node of claim 5, wherein the indication is a first indication, and the one or more processors are further configured to provide a second indication to the base station, the second indication indicating that the wireless node has sidelink capability or sidelink relaying capability.

7. The wireless node of claim 1, wherein the indication indicates that the wireless node has non-F1 capability.

8. The wireless node of claim 1, wherein the BAP configuration includes at least one of a destination address allocation, a default routing identifier allocation, a routing configuration, or a channel mapping configuration.

9. The wireless node of claim 1, wherein the one or more processors are further configured to receive an address allocation after providing the indication.

10. The wireless node of claim 1, wherein the one or more processors are further configured to process a packet based at least in part on the BAP configuration.

11. The wireless node of claim 1, wherein the one or more processors, to receive the BAP configuration, are configured to:
receive the BAP configuration without the BAP configuration being routed via an IAB donor distributed unit (DU).

12. The wireless node of claim 1, wherein the one or more processors, to receive the BAP configuration, are configured to:
receive the BAP configuration via a non-F1 interface.

13. A base station for wireless communication, comprising:
one or more memories; and
one or more processors, coupled to the one or more memories, configured to:
establish a radio resource control (RRC) connection with a wireless node;
receive, from the wireless node, an indication that the wireless node has backhauling capability,
wherein the indication includes a request to provide a backhaul adaptation protocol (BAP) configuration via the RRC connection, and
wherein the indication indicates that:
the wireless node has integrated access and backhaul (IAB) capability, and
the wireless node will not establish a connection with the base station via an F1 interface; and
transmit the BAP configuration to the wireless node over the RRC connection based at least in part on receiving the indication that the wireless node has backhauling capability.

14. The base station of claim 13, wherein the indication comprises an indication that the wireless node supports BAP processing.

15. The base station of claim 14, wherein the indication is a first indication, and the one or more processors are further configured to receive a second indication from the wireless node, the second indication indicating that the wireless node has sidelink capability or sidelink relaying capability.

16. The base station of claim 13, wherein the indication further indicates that the wireless node has non-F1 capability.

17. The base station of claim 13, wherein the BAP configuration includes at least one of a destination address allocation, a default routing identifier allocation, a routing configuration, or a channel mapping configuration.

18. The base station of claim 13, wherein the one or more processors are further configured to transmit an address allocation based at least in part on the indication.

19. The base station of claim 13, wherein the one or more processors are further configured to perform an authorization of the wireless node with a core network as a backhauling capable node based at least in part on the indication.

20. The base station of claim 13, wherein the one or more processors are further configured to perform an authorization of the wireless node with a core network as an IAB node based at least in part on the indication.

21. A method of wireless communication performed by a wireless node, comprising:
establishing a radio resource control (RRC) connection with a base station;
providing, to the base station, an indication that the wireless node has backhauling capability,
wherein the indication includes a request to receive a backhaul adaptation protocol (BAP) configuration via the RRC connection,
wherein the indication indicates that:
the wireless node has integrated access and backhaul (IAB) capability, and
the wireless node will not establish a connection with the base station via an F1 interface; and
receiving the BAP configuration from the base station over the RRC connection after providing the indication that the wireless node has backhauling capability.

22. The method of claim 21, further comprising:
receiving an address allocation after providing the indication.

23. The method of claim 21, wherein the BAP configuration includes at least one of a destination address allocation, a default routing identifier allocation, a routing configuration, or a channel mapping configuration.

24. The method of claim 21, wherein receiving the BAP configuration comprises:
receiving the BAP configuration without the BAP configuration being routed via an IAB donor distributed unit (DU).

25. A method of wireless communication performed by a base station, comprising:
establishing a radio resource control (RRC) connection with a wireless node;
receiving, from the wireless node, an indication that the wireless node has backhauling capability, wherein the indication includes a request to provide a backhaul adaptation protocol (BAP) configuration via the RRC connection,
wherein the indication indicates that:
the wireless node has integrated access and backhaul (IAB) capability, and
the wireless node will not establish a connection with the base station via an F1 interface; and
transmitting the BAP configuration to the wireless node over the RRC connection based at least in part on receiving the indication that the wireless node has backhauling capability.

26. The method of claim 25, further comprising:
transmitting an address allocation based at least in part on the indication.

27. The method of claim 25, further comprising:
performing an authorization of the wireless node with a core network as a backhauling capable node based at least in part on the indication.

28. The method of claim 25, wherein the BAP configuration includes at least one of a destination address allocation, a default routing identifier allocation, a routing configuration, or a channel mapping configuration.

29. The method of claim 25, wherein the indication further indicates that the wireless node has non-F1 capability.

30. The method of claim 25, wherein transmitting the BAP configuration comprises:
transmitting the BAP configuration without the BAP configuration being routed via an IAB donor distributed unit (DU).

* * * * *